(12) United States Patent
He et al.

(10) Patent No.: US 9,552,064 B2
(45) Date of Patent: Jan. 24, 2017

(54) EYE TRACKING AND USER REACTION DETECTION

(71) Applicant: Shenzhen Huiding Technology Co., Ltd., Shenzhen (CN)

(72) Inventors: Yi He, San Diego, CA (US); Bo Pi, Carlsbad, CA (US)

(73) Assignee: Shenzhen Huiding Technology Co., Ltd., Shenzhen (CN)

( * ) Notice: Subject to any disclaimer, the term of this patent is extended or adjusted under 35 U.S.C. 154(b) by 21 days.

(21) Appl. No.: 14/556,051

(22) Filed: Nov. 28, 2014

(65) Prior Publication Data

US 2015/0145777 A1    May 28, 2015

Related U.S. Application Data

(60) Provisional application No. 61/909,998, filed on Nov. 27, 2013, provisional application No. 61/911,430, filed on Dec. 3, 2013.

(51) Int. Cl.
| | | |
|---|---|---|
| *G06F 3/033* | (2013.01) | |
| *G09G 5/08* | (2006.01) | |
| *G06F 3/01* | (2006.01) | |
| *G06F 3/03* | (2006.01) | |
| *G06K 9/00* | (2006.01) | |
| *G06K 9/20* | (2006.01) | |

(52) U.S. Cl.
CPC ............ *G06F 3/013* (2013.01); *G06F 3/0304* (2013.01); *G06K 9/0061* (2013.01); *G06K 9/2027* (2013.01)

(58) Field of Classification Search
CPC ...... G06F 3/03393; G06F 3/042; G06F 3/038; G06F 1/1626; G06F 3/0304
USPC .......... 345/7–9, 156–158, 684; 382/103, 115
See application file for complete search history.

(56) References Cited

U.S. PATENT DOCUMENTS

| | | |
|---|---|---|
| 3,864,030 A | 2/1975 | Cornsweet |
| 5,610,673 A | 3/1997 | Rafal et al. |
| 5,956,124 A | 9/1999 | Dan |
| 6,373,961 B1 | 4/2002 | Richardson et al. |
| 6,542,624 B1 | 4/2003 | Oda |

(Continued)

FOREIGN PATENT DOCUMENTS

| | | |
|---|---|---|
| WO | 2015/038810 A2 | 3/2015 |
| WO | 2015/070182 A2 | 5/2015 |

OTHER PUBLICATIONS

International Search Report and Written Opinion mailed on Feb. 25, 2015 for International Application No. PCT/US2014/055243, filed on Sep. 11, 2014 (10 pages).

(Continued)

*Primary Examiner* — Kimnhung Nguyen
(74) *Attorney, Agent, or Firm* — Perkins Coie LLP

(57) ABSTRACT

Methods, systems, and devices are disclosed for optical sensing and tracking of eye movement. In one aspect, a device for obtaining a user's eye dynamics data includes a display screen to present at least one content. The device includes an eye sensing module to obtain the user's eye dynamics data including the user's eye movement while presenting to the user the at least one content on the display screen. The device includes a processor in communication with the eye sensing module. The processor can determine the user's reaction to the at least one content presented on the display screen based at least partly on the obtained user's eye dynamics data.

45 Claims, 30 Drawing Sheets

(56) References Cited

U.S. PATENT DOCUMENTS

| | | |
|---|---|---|
| 6,634,749 B1 | 10/2003 | Morrison et al. |
| 7,380,938 B2 | 6/2008 | Chmielewski, Jr. et al. |
| 8,878,773 B1 | 11/2014 | Bozarth |
| 9,323,325 B2 * | 4/2016 | Perez ................ H04N 13/0278 |
| 2002/0041259 A1 | 4/2002 | Lewis et al. |
| 2002/0093645 A1 | 7/2002 | Heacock |
| 2003/0038754 A1 | 2/2003 | Goldstein et al. |
| 2004/0032952 A1 | 2/2004 | Pinto et al. |
| 2004/0170304 A1 | 9/2004 | Haven et al. |
| 2005/0073136 A1 | 4/2005 | Larsson et al. |
| 2006/0110008 A1 | 5/2006 | Vertegaal et al. |
| 2006/0256083 A1 | 11/2006 | Rosenberg |
| 2007/0159599 A1 | 7/2007 | Yamada |
| 2008/0044188 A1 | 2/2008 | Kagawa et al. |
| 2009/0046249 A1 | 2/2009 | Northcott et al. |
| 2009/0046899 A1 | 2/2009 | Northcott et al. |
| 2009/0141339 A1 | 6/2009 | Yurlov et al. |
| 2009/0192961 A1 | 7/2009 | Fithian et al. |
| 2011/0069277 A1 | 3/2011 | Blixt et al. |
| 2011/0170060 A1 | 7/2011 | Gordon |
| 2011/0182472 A1 | 7/2011 | Hansen |
| 2012/0105486 A1 | 5/2012 | Lankford et al. |
| 2012/0256967 A1 | 10/2012 | Baldwin et al. |
| 2013/0077049 A1 | 3/2013 | Bohn |
| 2013/0094712 A1 | 4/2013 | Said |
| 2013/0176533 A1 | 7/2013 | Raffle et al. |
| 2013/0188834 A1 | 7/2013 | Ebisawa |
| 2014/0075349 A1 * | 3/2014 | Yun ........................ G06F 3/013 715/764 |
| 2014/0354514 A1 * | 12/2014 | Aronsson ................ G06F 3/013 345/7 |
| 2014/0361957 A1 * | 12/2014 | Hua ........................ G06F 3/013 345/8 |
| 2015/0070273 A1 | 3/2015 | He et al. |
| 2015/0199006 A1 | 7/2015 | He et al. |

OTHER PUBLICATIONS

International Search Report and Written Opinion mailed on Feb. 19, 2015 for International Application No. PCT/US2014/064884, filed on Nov. 10, 2014 (12 pages).

International Search Report and Written Opinion mailed on Apr. 16, 2015 for International Application No. PCT/US2014/067827, filed on Nov. 28, 2014 (10 pages).

* cited by examiner

Eye tracker implemented on a smartphone

Eye tracker implemented on a computer monitor or TV.

Eye tracker can also be implemented on a head mount display (HUD) device

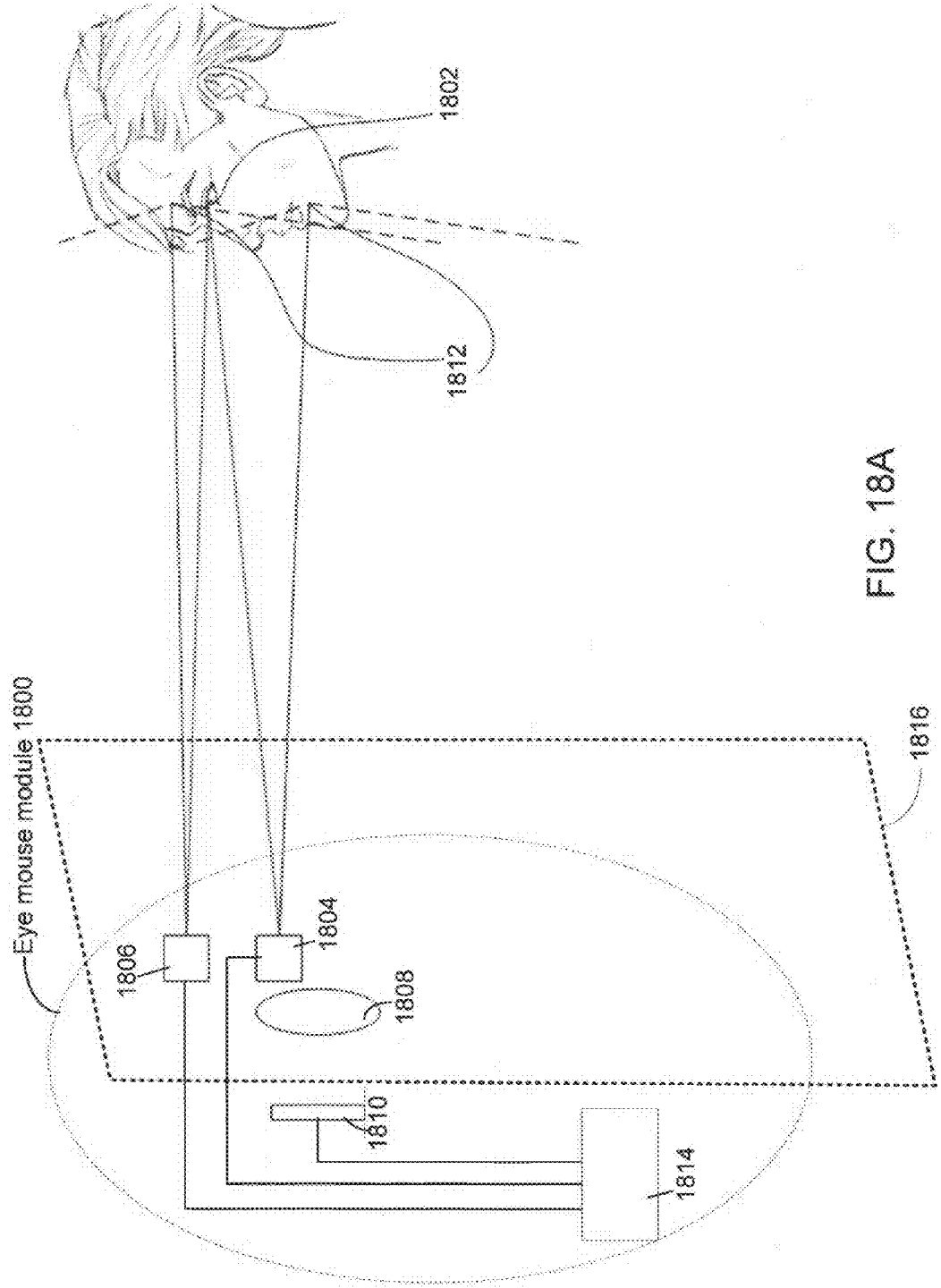

EYE TRACKING AND USER REACTION DETECTION

CROSS REFERENCE TO RELATED APPLICATIONS

This patent document claims the benefits and priorities of U.S. Provisional Patent Application No. 61/909,998, filed on Nov. 27, 2013, and U.S. Provisional Patent Application No. 61/911,430, filed on Dec. 3, 2013. The entire contents of the before-mentioned patent applications are incorporated by reference as part of the disclosure of this document.

TECHNICAL FIELD

This patent document relates to eye tracking and eye reaction sensing technologies.

BACKGROUND

The eye is a complex anatomical component of the visual system that collects light from the surrounding environment, regulates its intensity through a diaphragm, focuses it through an adjustable assembly of lenses to form an image, converts this image into a set of electrical signals, and transmits these signals to the brain through complex neural pathways that connect the eye via the optic nerve to the visual cortex and other areas of the brain. The eye provides the ability to recognize differences in two aspects of light: brightness (based on the luminance of light) and color (based on the wavelength of light). Cones are a class of photoreceptors in the back of the eye (i.e., the retina) that provide well-defined visual acuity and color vision when in bright light. Rods are highly sensitive photoreceptors in the outer regions of the retina to provide optical information in reduced lighting for night vision as well as assist in peripheral vision in brighter lighting conditions.

The eye has a complex structure with various parts or components that cause optical reflections. The main locations of eye reflection include, for example, corneal reflections of light reflected off the cornea, iris reflections of light reflected off the iris, and retroreflections of light reflected off the retina. Such reflections can cause adverse effects in some applications such as the red-eye effects in photographing and may also be used in various optical systems, e.g., eye tracking devices.

SUMMARY

Methods, systems, and devices are disclosed for optical sensing and tracking of eye movement, including techniques for detecting and tracking the gaze or aiming of the user's eye or eyes relative to a display screen of a device, such as a touch sensing screen in real time. Examples of implementations of the disclosed technology include generating a cursor or indicator on the display screen based on the detected gaze or aiming of the eye or eyes of the user, and using the generated cursor or indicator to perform various functions. Examples of the possible functions include selecting, activating, or otherwise interacting with various applications, documents and user interfaces. The selecting, activating or interacting can cause a desired action, operation or effect on a device. In some implementations, the eye gaze tracking can be used with an additional user input such as one or more operational buttons, switches or triggers on the device. The eye tracking and detection of the eye gaze or aiming on the display screen can be used to direct a position of the cursor to perform various function to effectuate an "eye mouse" operation without having a physical mouse or pointer device to control the movement or position of the cursor on the display screen. In mobile or hand-held devices, this "eye mouse" function can be used to enable a single hand operation or control of various operations and functions via the display screen.

In addition, methods, systems, and devices are disclosed for using a user's eye dynamics to analyze and report the user's reaction to contents on a display screen of a device. Examples of implementations of the disclosed technology can include using an eye sensing module integrated with the device to obtain the user's eye dynamics data presenting at least one content on the display screen of the device. The user's eye dynamics data includes at least user's eye movement and changes in the user's pupil size. The obtained user's eye dynamics data is analyzed to determine the user's reaction to the contents displayed on the display screen.

In one aspect, a device for obtaining a user's eye dynamics data includes a display screen to present at least one content. The device includes an eye sensing module to obtain the user's eye dynamics data including the user's eye movement while presenting to the user the at least one content on the display screen. The device includes a processor in communication with the eye sensing module. The processor can determine the user's reaction to the at least one content presented on the display screen based at least partly on the obtained user's eye dynamics data.

The device can be implemented in various ways to include one or more of the following features. The user's eye dynamics data can include a change in the user's pupil size. The device can include an ambient light sensing module in communication with the processor to obtain an ambient light condition. The processor can determine the user's reaction to the at least one content presented on the display screen based at least partly on the obtained user's eye dynamics data and the ambient light condition. The processor is in communication with the display screen to obtain display screen characteristics including at least one of display brightness variation data or display backlighting data, and determine the user's reaction to the at least one content displayed on display screen based at least partially on the obtained display screen characteristics and the user's eye dynamics data. The device can include at least one motion sensor in communication with the processor to obtain a motion parameter of the device. The processor can determine the user's reaction to the at least one content presented on the display screen based at least partly on the obtained user's eye dynamics data and the motion parameter. The device includes a mobile device.

In another aspect, a method for determining a user's reaction to at least one content presented on a display screen of a device is described. The method includes presenting at least one content on the display screen of the device. The method includes detecting, by an eye sensing module integrated with the device, the user's eye dynamics to obtain data indicative of the user's eye movement or changes in the user's pupil size while presenting the at least one content on the display screen of the device. The method includes associating the obtained user's eye dynamics data with the at least one content presented on the display screen to generate user reaction data.

The method can be implemented in various ways to include one or more of the following features. The method can include transmitting the generated user reaction data to a server. The server can be associated with a content provider that provides the at least one content. The method can include receiving from the server a different content selected based at least partly on the user reaction data transmitted to the server. The associating can include associating an increase in the user's pupil size with an indication of an increased interest of the user in the at least one content presented on the display screen. The associating can include associating a steadiness of the user's eye movement with an indication of a focus of the user's attention on the at least one content presented on the display screen.

In another aspect, a server for providing user reaction feedback information is described. The server includes a processor to receive from multiple user devices, user reaction data associated with a common content presented to the multiple user devices; analyze the user reaction data associated with the common content presented to multiple user devices; generate an output based on the analysis of the user's reaction to the commonly presented content; and report the generated output to a content provider that provided the commonly presented content.

The server can be implemented in various ways to include one or more of the following features. The generated output can include statistical results.

In another aspect, a device for eye-tracking is described. The device includes a photodetector module. The device includes two groups of light sources disposed on the device at respective locations relative to a location of the photodetector module, each group of light sources to emit a modulated light. The respective modulated lights emitted by the two groups of light sources are modulated at a substantially same modulation frequency and out of phase with each other. Responsive to emitting the modulated lights by the two groups of light sources, the photodetector module receives a return light including at least a partial retroreflected light from an eye of the user. The device includes a processor in communication with the photodetector module and the two groups of light sources, the processor is configured to process an output signal from the photodetector module to determine positional and dimensional parameters of the eye of the user based at least on the received partial retroreflected light. In some implementations, the device may include more than two groups of light sources.

The device can be implemented in various ways to include one or more of the following features. The location of one of the groups of light sources can be closest to the photodetector module than any other in the two or more groups of light sources such that the partial retroreflected light received by the photodetector module is based more on the modulated light emitted by the group of light sources having the closest location than any other in the two or more groups of light sources. The device can include a receiving lens positioned in front of the photodetector module to collect the received partial retroreflected light and direct the collected partial retroreflected light onto the photodetector module. One group of light sources can be disposed in proximity of an optical axis of the receiving lens and another group of light sources can be disposed away from the optical axis of the receiving lens. The receiving lens and the two or more groups of light sources can be arranged so that the retroreflected light from the eye based on the modulated light emitted by one of the groups of light sources projects substantially onto the receiving lens, and wherein the retroreflected light from the eye based on the modulated light emitted by another group of light sources projects substantially off the receiving lens. The device can include filtering circuitry communicatively linked to the photodetector module to filter the photodetector module output signal to reject background light and scattered light based on the respective modulated lights. The scattered light can be generated when the respective modulated lights scatter off the user's face and other surfaces near the user's face. The scattered light based on the modulated light emitted by one of the groups of light sources can be substantially 180° out of phase with respect to the scattered light based on the modulated light emitted by another group of light sources. The filtering circuitry can include a bandpass filter to reject the background light. The two or more groups of light sources can emit respective modulated lights at substantially the same wavelength. The device can include a display interface. The processor can determine a location of gaze of the eye of the user based on the determined positional parameters, and the display interface can display a cursor on the display interface at the determined location of gaze. The display interface and the processor in combination can actively adjust the position of the cursor based on updated positional parameters. A strength of the output signal from the photodetector module can be proportional to a strengthen of the retroreflection of the eye, which can be further proportional to the pupil size of the eye.

In another aspect, a mobile device for controlling a cursor based on a user's gaze is described. The mobile device includes a display interface, and a surface area adjacent to the display interface. The device includes a first group of light sources placed at a first location on the surface area to emit a first modulated light. The device includes a second group of light sources placed at a second location on the surface area to emit a second modulated light. The first modulated light and the second modulated light have substantially the same modulation frequency, and the modulation phases of the first modulated light and the second modulated light are substantially opposite to each other. The first group of light sources and the second group of light sources can emit the first and second modulated lights toward an eye of a user of the user-operated device. The mobile device includes a photodetector module to receive a return light including at least a partial retroreflected light from an eye of the user based on the first and second modulated lights emitted from the first and second groups of light sources. The device includes a processor communicatively coupled to the photodetector module and the first and second groups of light sources. The processor can process an output signal from the photodetector module to determine a location of gaze of the eye of the user based at least on the partial retroreflected light corresponding to the first and second modulated lights. The display interface can display a cursor at the determined location of gaze.

The method can be implemented in various ways to include one or more of the following features. The display interface in collaboration with the processor can continuously adjust the position of the cursor based on updated locations of gaze of the eye. The photodetector module can track relative linear motions and rotational motions between the mobile device and the eye of the user, and generate the output signal which reflects effects of the relative linear motions and rotational motions on the location of gaze. The strength of the output signal from the photodetector module can proportional to the strengthen of the retroreflection of the eye, which can be proportional to the pupil size of the eye. The processor can process the output signal to determine the size of the pupil of the eye. The processor can process the output signal to determine a distance between the mobile device and the eye of the user. The mobile device can include a device exterior; and one or more buttons located on the mobile device to perform mouse functions at the location of the displayed cursor. The one or more buttons can be placed on the left side, right side, or back side of the device exterior. The one or more buttons can be displayed on the display interface. The one or more buttons can operate in combination with existing buttons of the mobile device. The one or more buttons can perform regular mouse's left click, right click, middle click functions.

In another aspect, a method for tracking eye movement at a device is described. The method includes using a first group of light sources of the device to emit a first modulated light and a second group of light sources of the device to emit a second modulated light toward an eye of a user. The first modulated light and the second modulated light have substantially the same modulation frequency, and the modulation phases of the first modulated light and the second modulated light are substantially opposite to each other. The method includes receiving at a photodetector module of the device, a returned light including at least a partial retroreflected light from the eye of the user based on the first and second modulated lights from the first and second groups of light sources. The method includes filtering the received return light to reject background light and scattered light. The method includes processing an output signal from the photodetector module to determine positional and dimensional parameters of the eye of the user based at least on the partial retroreflected light corresponding to the first and second groups of modulated light sources.

The method can be implemented in various ways to include one or more of the following features. The scattered light based on the first modulated light can be substantially 180° out of phase with respect to the scattered light based on the second modulated light. Processing the output signal can include determining the positional and dimensional parameters of the eye based on differential values of the partial retroreflected lights corresponding to the first and second groups of light sources. The method includes using the first and second groups of light sources to emit visible lights. The method includes using the first and second groups of light sources to emit modulated lights in the ultraviolet and infrared wavelengths. The method includes using the first and second groups of light sources to emit modulated light of different wavelengths and calibrating the first and second groups of light sources to be matched. The method includes using the first and second groups of light sources to emit light of same modulation frequency to perform self-cancellation detection. The method includes processing the output signal from the photodetector module to determine a location of gaze of the eye of the user on a display screen of the device based at least on the partial retroreflected light corresponding to the first and second modulated lights; and displaying on the display screen a cursor at the determined location of gaze. The method includes continuously adjusting the position of the cursor on the display interface based on updated locations of gaze of the eye. The method includes using the first and second groups of light sources to emit light of different modulation frequencies to detect a direction of eye gaze. The first and second light sources and the photodetector module can located on an edge of the device. The emitted first and second modulated lights can include a flashing light at a frequency correlated with a frame rate of the photodetector module to enhance the eye signal detection and further reject the background light. The method includes changing the location of the cursor responsive to a change in the eye gaze direction; and providing one or more cursor activation buttons on the device to activate a selection, an operation or interaction of the cursor on the display screen. The method includes configuring the one or more cursor activation buttons to provide additional control functions on the device. The method includes using an input received through the one or more cursor activation buttons to activate a function to detect a change in the eye's pupil size change in connection with tracking the eye movement. The method includes detecting the eye gaze direction in connection with tracking the eye movement based on an input received through the one or more cursor activation buttons. The method includes transmitting and receiving data carried on the emitted modulated lights and detected return light based on an input received through the one or more cursor activation buttons. The method includes processing the output signal from the photodetector module to determine a location of gaze of the eye of the user on a display screen of the device based at least on the partial retroreflected light corresponding to the first and second modulated lights; and using the determined location of the gaze of the eye of the user on the display screen to detect the user's gaze on a pay-per-gaze advertisement. The method includes processing the output signal from the photodetector module to determine a location of gaze of the eye of the user on a display screen of the device based at least on the partial retroreflected light corresponding to the first and second modulated lights; and using the determined location of the gaze of the eye of the user on the display screen to control a game play in a game application. The method includes presenting at least one content associated with marketing research on a display screen of the device; and analyzing the determined positional and dimensional parameters of the eye of the user to determine the user's reaction to the at least on content displayed on the display screen; and collecting the determined users' reaction to the presented at least one content associated with market research. The method includes processing the output signal from the photodetector module to determine a location of gaze of the eye of the user on a display screen of the device based at least on the partial retroreflected light corresponding to the first and second modulated lights; and using the determined location of the gaze of the eye of the user on the display screen to enable secure access or secure data input.

BRIEF DESCRIPTION OF THE DRAWINGS

FIG. 18A shows a diagram of an exemplary eye mouse module which includes eye sensor mechanism and a self-cancellation structure.

DETAILED DESCRIPTION

Examples of implementations of the disclosed technology includes devices, systems and techniques for monitoring and tracking position and movement of the aiming of an eye or eyes on a display screen in real time; using the eye aiming or gaze on the display screen to place and move a cursor on the display screen; and using a physical trigger on the device to use the cursor to select, activate or interface with an object, document, software or icon on the display screen.

In another aspect, the disclosed technology provides for using a user's eye dynamics to analyze and report the user's reaction to contents on a display screen of a device. An eye sensing module integrated with the device is used to measure the user's eye dynamics data while presenting one or more contents on the display screen of the device (e.g., while the user is viewing the display screen of the device). The user's eye dynamics data includes at least user's eye movement and changes in the user's pupil size. The measured user's eye dynamics data is analyzed to determine the user's reaction to the contents displayed on the display screen.

Figure 1:
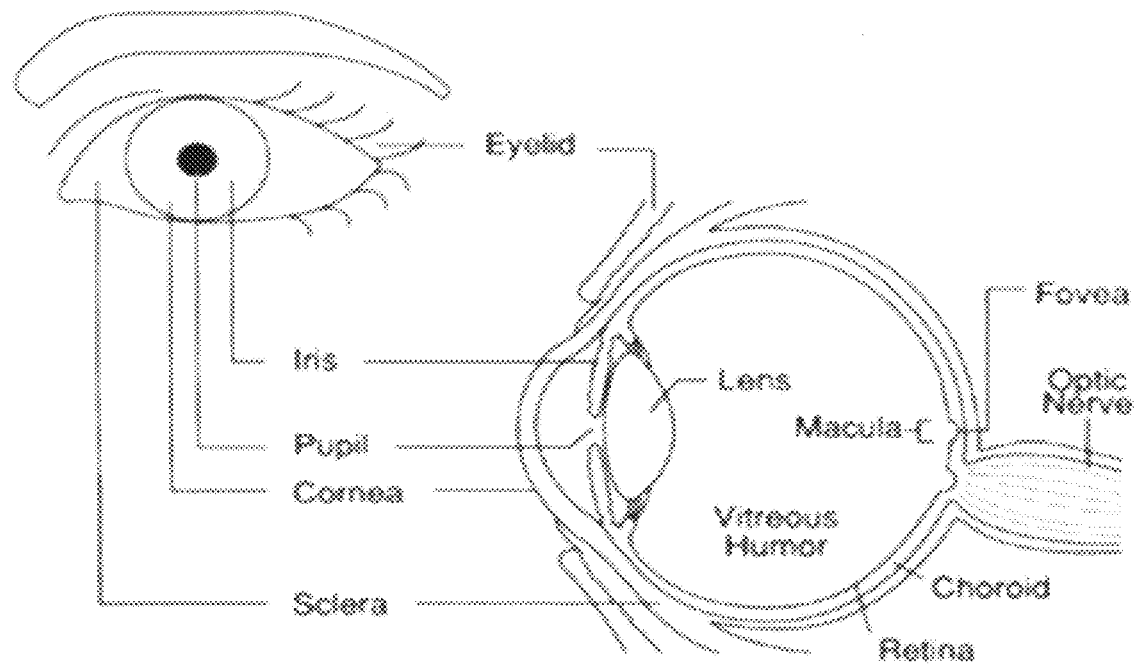
FIG. 1 shows a diagram of the anatomy of a human eye.

FIG. 1 shows a diagram of the anatomy of a human eye. The outer wall of the eye includes three concentric layers. The outer layer includes the cornea, which is a transparent structure that covers the iris and lens that function as the focusing system of an eye, and the sclera, which is an opaque structure forming a fibrous, protective, outer layer of the eye containing collagen and elastic fiber and also referred to as the 'white of the eye'. The iris is a thin, circular structure in the eye containing pigment, e.g., determining one's 'eye color', and that controls the diameter and size of the pupil. The pupil is the adjustable opening at the center of the iris that allows varying amounts of light to enter the eye through the lens. The lens is a transparent, biconvex structure that can refract light to focus it on the retina. The retina is a layered structure in the back of the eye with several layers of neurons (the photoreceptor cells) interconnected by synapses to receive the focused light as an image and transduce the image into electro-chemical neurological signals. The photoreceptor cells of the retina include cones (e.g., ~6% of the photoreceptor cells) and rods (e.g., ~94% of the photoreceptor cells), which are located mainly along the peripheral of the retina. Cones are concentrated in the center region of the retina, known as the fovea. The macula is an oval-shaped highly pigmented yellow spot near the center of the retina and containing the fovea, parafovea, and perifovea. The fovea is a small pit that contains the largest concentration of cone cells in the eye and is responsible for central, high resolution vision. The choroid is a region of the eye rich in blood vessels that supplies the outer layers of the retina. The eye also includes fluids such as the aqueous humor located in the front region between the cornea and the iris and the vitreous humor located in the rear region behind the lens.

The vision field is generally divided in to three regions: the fovea, parafovea and peripheral vision regions. The fovea region provides the sharpest vision; the parafovea region previews foveal information; and the peripheral vision reacts to flashing objects and sudden movements. For example, peripheral vision includes approximately 15-50% of the acuity of the fovea and it is also less color-sensitive.

Figure 2:
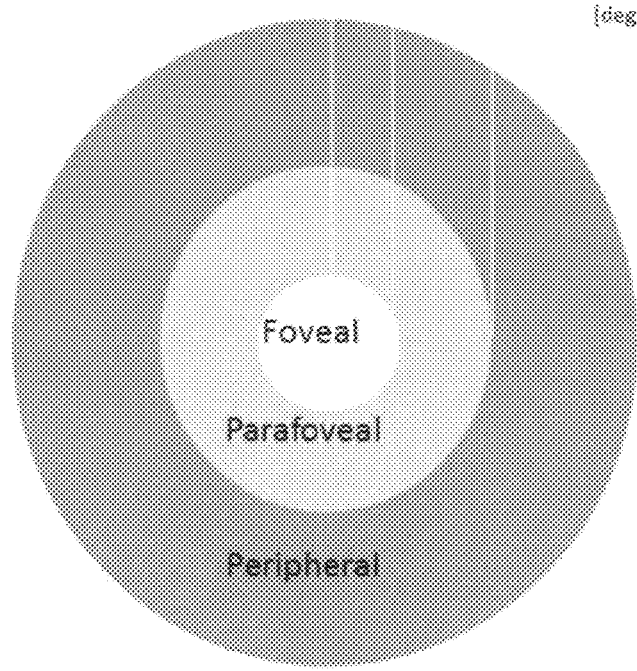
FIG. 2 shows a diagram of the vision field.

FIG. 2 shows a diagram of the vision field including the fovea, parafovea and peripheral vision regions with an exemplary degree of the visual field that the regions can see. In the human eye, the three vision field regions are asymmetric. For example, in reading, the so-called perceptual span (e.g., size of the effective vision), is 3-4 letter spaces to the left of fixation and 14-15 letter spaces to the right. Also for example, 1° of visual angle is roughly equivalent to 3-4 letter spaces.

Eyes move all the time, e.g., even during sleep. There are several different types of eye movement which can include pursuit, tremor, rotation, drift, and saccades. In humans, the eyes move around when looking at a scene, rather than a fixed steadiness, locating parts of interest of the scene to mentally create a three-dimensional map corresponding to the scene. For example, when scanning a scene or while reading words on a page, the eyes make jerky saccadic movements and stop several times, moving very quickly between each stop. A saccade is a fast movement or 'jump' of an eye, which connect fixations.

Saccades can be quick, simultaneous movements of both eyes in the same direction. Saccades occur rapidly, e.g., with durations of 40-120 ms, move quickly, e.g., up to 600°/s, and are ballistic, in which the end point of saccade cannot be changed during the movement. The saccadic movements of the human eye may be due to the role of the in resolving objects detected in vision, e.g., such that by moving the eye so that small parts of a scene can be sensed with greater resolution using the visual processing functionality of the nervous system more efficiently. A visual fixation, on the other hand, is when the eye maintains a gaze on a single location. In fixation, the eye is a relatively still and 'fixated' to the certain point, e.g., such as when reading a single word. In vision, information from the scene is mainly acquired during fixation. For example, the duration of fixation can vary from 120-1000 ms, e.g., typically 200-600 ms, and a typical fixation frequency is less than 3 Hz.

Figure 3A:
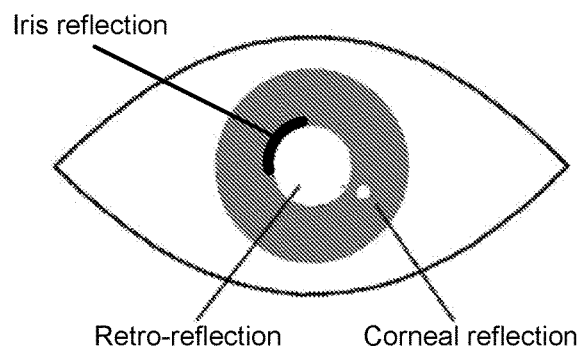
FIGS. 3A and 3B show a diagram and an image of an eye illustrating the three reflections when the eye is illuminated by light sources.
Figure 3B:
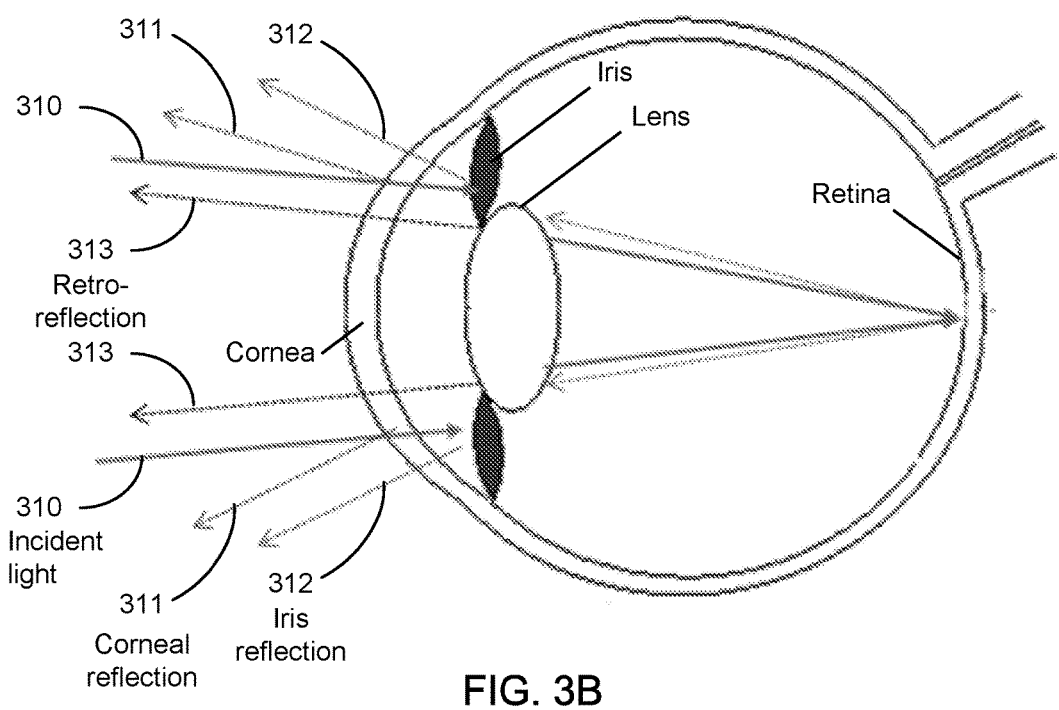

FIGS. 3A and 3B show an image and a diagram of an eye illustrating the three reflections when the eye is illuminated by light sources. The three types of eye reflections include corneal reflections of light reflected off the cornea, iris reflections of light reflected off the iris, and retroreflections of light reflected off the retina. For example, as shown in FIG. 3A, a corneal reflection forms a tiny spot; an iris reflection can look dark but colorful; and a retroreflection can be bright with strong direction dependence. The diagram of FIG. 3B shows a reflected light beam 311 reflected by corneal reflection based on an incident light beam 310 incident upon the cornea of an eye; a reflected light beam 312 reflected by iris reflection based on the incident light beam 310 having passed through the cornea of the eye and incident upon the iris; and a reflected light beam 313 reflected by retroreflection based on the incident light beam 310 having passed through the cornea and lens of the eye and incident upon the retina.

Eye tracking is the process of measuring a point of gaze (where one is looking) or motion of an eye relative to the head. Eye tracker devices and systems measure eye positions and eye movement. Eye tracking has been used clinically and in research on the visual system in medical and cognitive studies, as well as in psychology, in cognitive linguistics and in product design.

One example of an existing eye tracking modality includes video-based eye tracking techniques, e.g. referred to as the single point method. Such conventional techniques in the single point method include tracking one visible feature of the eyeball, e.g., such as the limbus (the boundary of sclera and iris), and/or the pupil. For example, a video camera can observe one of the user's eyes. Image processing software analyzes the video image and traces the tracked feature. Based on calibration, the system determines where the user is currently looking. In such systems, head movements are not allowed, and a bite bar or head rest is typically required. In an alternative but related example of a video-based eye tracking technique, substantially the same idea is implemented as in the previously described example of the single point method, except that two features of eye are tracked, e.g., corneal reflection and the pupil. Such methods use IR light (invisible to human eye) to produce corneal reflection and to cause a bright or dark pupil, which helps the system to recognize pupil from video image.

Each of these exemplary conventional methods suffer from significant limitations and deficiencies. For example, both need extra device(s) either mounted on floor or head. Also, such methods require eye tracking systems or devices that cannot be merged into mobile devices like smartphones or tablets. Additionally, these conventional methods provide very limited information that can be withdrawn, e.g., no matter using bright pupil measuring or dark pupil measuring, and the associated software can be quite complicated and unreliable.

The disclosed technology provides for optical sensing and tracking of eye movement using a user interface to interact with a device. The optical sensing and tracking functions can be integrated into the device in some implementations. For example, the disclosed eye tracking technology can be integrated with mobile devices (e.g., smartphones and tablets) and computing devices (e.g., such as computer monitors) to track an operator's eye position, movement, and blinking state. The disclosed technology can use the retroreflection of light from the eye based on fixation and saccade eye movements for optical sensing and eye tracking In one aspect, a method for tracking the movement of an eye includes emitting light toward an eye of a user using multiple (e.g., three) light sources equally spaced from a photodetector module (e.g., a camera) of a device, receiving at the photodetector module at least a partial retroreflection of the light emitted by each of the multiple light sources retroreflected from the eye, and determining a positional parameter of the eye based on differential values of the at least partial retroreflections corresponding to the multiple light sources. For example, the device can include, but is not limited to, a smartphone, a tablet, a picture or video camera, a computer monitor, or a laptop computer. In some implementations, for example, the method can be implemented while the head of the user is in motion, e.g., relative to the device. In some implementations of the method, for example, the multiple (e.g., three) light sources can emit colored light of different colors, e.g., in which the colored light can include red light, green light, blue light, and yellow light, or any combination thereof, different wavelengths, and/or different modulations of frequency. In some implementations of the method, for example, the emitted light can include infrared light. Also, for example, the emitted light can include flashing light at a frequency correlated with a frame rate of the photodetector module (e.g., camera). In some implementations, for example, the method further includes using the at least partial retroreflections received at the exemplary camera, detecting blinking movements of the eye. Additionally, the method can further include processing the detected blinking movements as data, and in some implementation, the method can also use the data as input data for at least one function of the device.

Figure 4A:
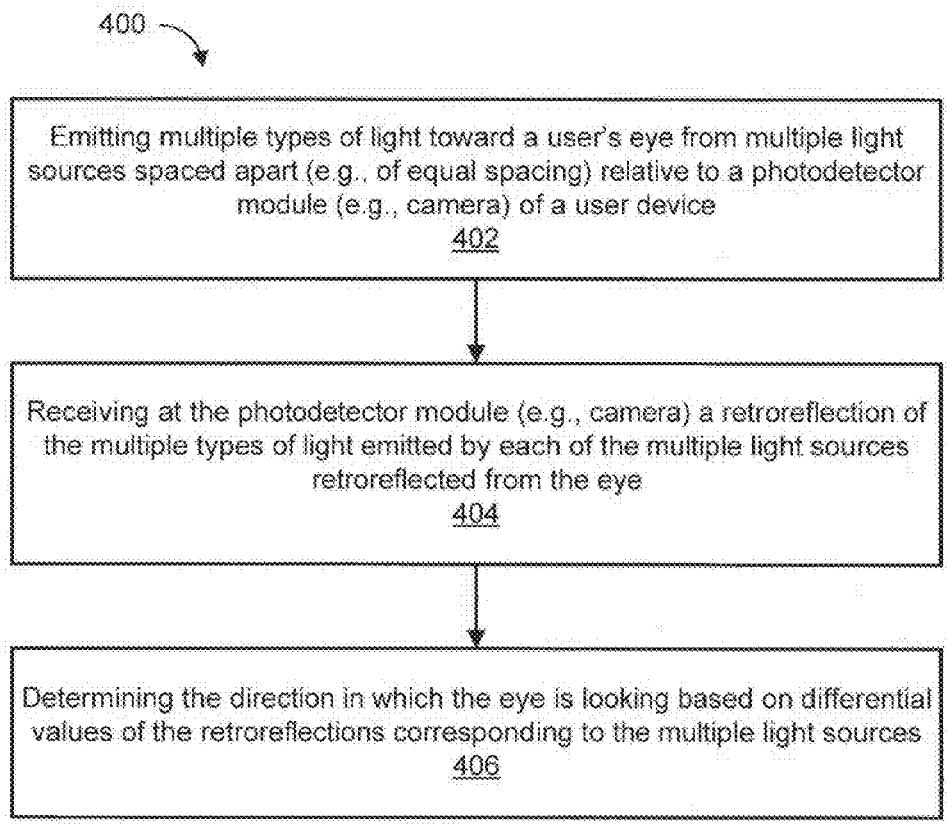
FIG. 4A shows a process diagram depicting the steps of the exemplary method of the disclosed technology for tracking the movement of an eye.

FIG. 4A shows a process diagram depicting an exemplary method 400 of the disclosed technology for tracking movement of an eye. The method 400 includes a process to emit multiple (e.g., three) types of light from multiple respective light sources toward the eye of the user, in which the three light sources are equally spaced relative to a photodetector module (e.g., a camera) of a user's device (402). For example, the process can be implemented using one camera, in which the three light sources are offset from the camera with equal distance.

Figure 4B:
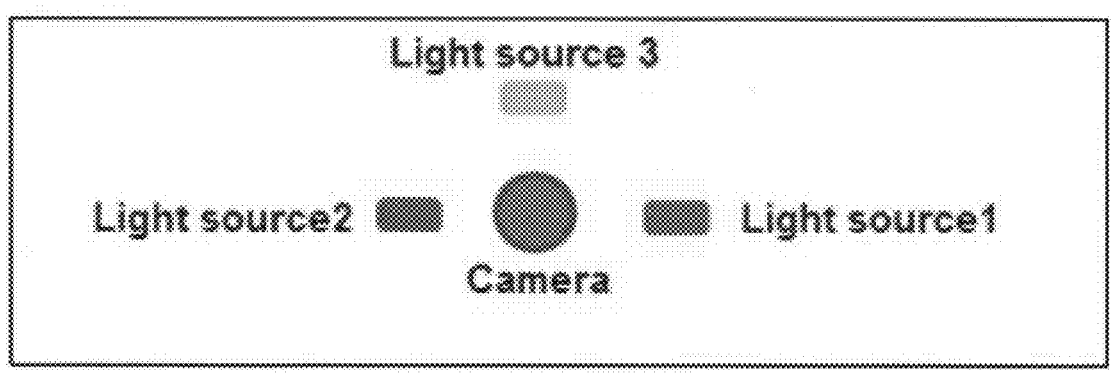
FIG. 4B shows a illustrative diagram of an exemplary interface of a user device to implement the exemplary eye tracking method.

The method includes a process to receive at least a partial retroreflection of the three types of light emitted by each of the three light sources that is retroreflected from the eye using the exemplary camera (404). For example, the distance is configured such that the camera can receive at least partial of the retro-reflections from all light sources. Also, the three light sources can emit colored light of the same or differing colors, or in other examples, infrared light to avoid stimulating the user. In some examples, the light sources can be color light-emitting diodes (LEDs), as exemplified in FIG. 4B, which shows an illustrative diagram of an exemplary interface of the user's device to implement the exemplary eye tracking method. The exemplary LEDs can be selected to emit particular RGB color, e.g., to match a color filter on the camera sensor. The exemplary LEDs can be infrared LEDs. The exemplary color or infrared LEDs can be turned on in a sequence that is synchronized with the camera video frames. Also, for example, the three light sources can emit flashing light in time domain, but it is noted that flashing light may reduce the data rate.

Referring back to FIG. 4A, the method includes a process to determine a positional parameter of the eye, e.g., such as the direction in which the eye is looking or the location of the eye in space (406). For example, by calculating the differential values of the three retroreflections (e.g., at least partial retroreflections corresponding to the three light sources), the direction and other parameters of eye movement can be determined.

In some examples, the process to determine the direction, location, and/or other positional parameters of the eye and eye movement can include the following.

The disclosed method is not sensitive to eye distance and head movement, e.g., providing a reliable eye tracking solution. This eye tracker also can easily detect operator eye blinking reliably, in which the blinking information can be processed as data and used as input for the device. For example, smartphone operation tends to be at a distance of 1 to 2 feet. The disclosed method can function with head-free accuracy at a variety of distances and angles, e.g., including 0.1°-0.25°, and include head-free resolution of 0.02° rms.

The disclosed method can be implemented track the movement of both eyes of the user sequentially or concurrently.

Figure 5A:
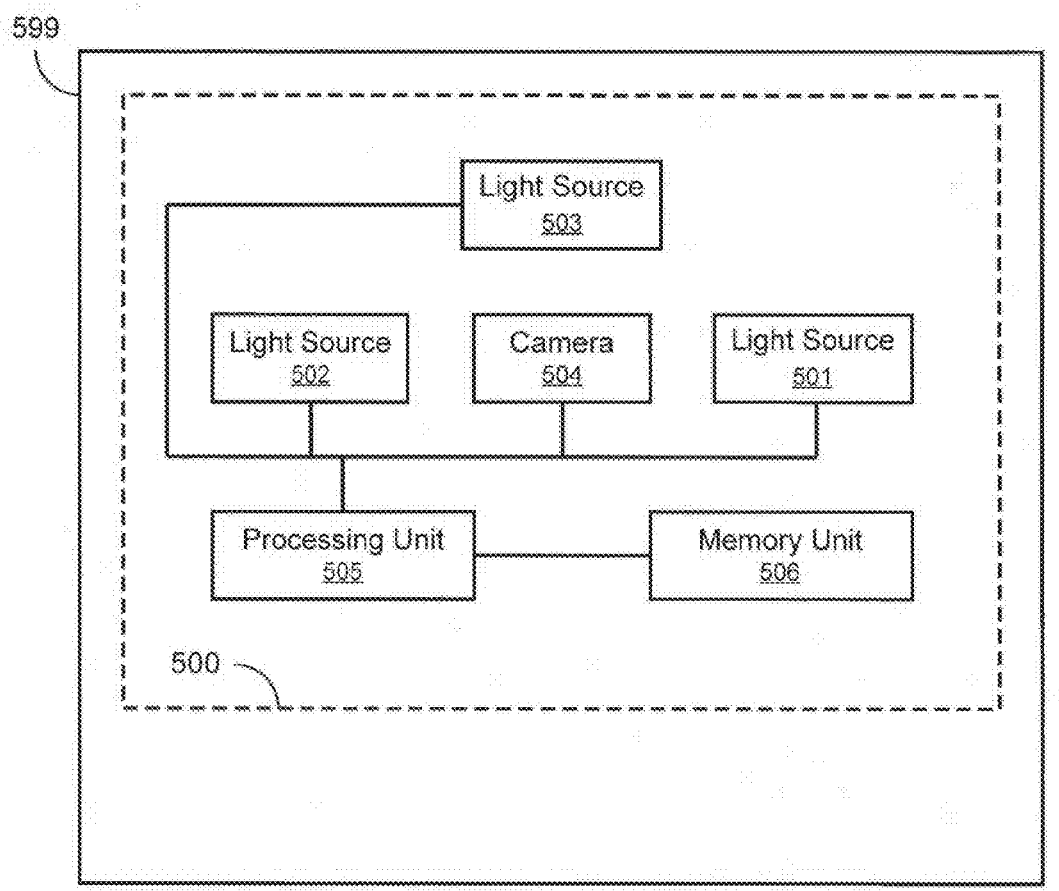
FIG. 5A shows a block diagram of an exemplary eye tracking unit of the disclosed technology implemented in a user device.

FIG. 5A shows a block diagram of an eye tracking unit or device 500 implemented in a user's device 599, e.g., which can be, but is not limited to, a smartphone, a tablet, a picture or video camera, a computer monitor, or a laptop computer. The eye tracking unit 500 includes three light sources 501, 502, and 503 equally spaced from each other relative to a camera 504 of the device 599. The eye tracking unit 500 includes a processing unit 505 coupled to a memory unit 506. The memory unit 506 can, for example, include processor-executable code, which when executed by the processing unit 505, configures the eye tracking unit 500 to perform various operations, such as receiving information, commands, and/or data, e.g., from the camera 504, processing information and data, and transmitting or providing information/data or commands to another entity, e.g., such as the light sources 501, 502, and 503 and/or the camera 504, or to the user device 599. In some implementations, for example, the memory unit 506 can be configured as a disk or solid-state device (SSD) storage unit.

In some implementations, the eye tracking unit or device 500 can utilize the processing unit(s) and/or memory unit(s) of the user device 599.

Figure 5B:
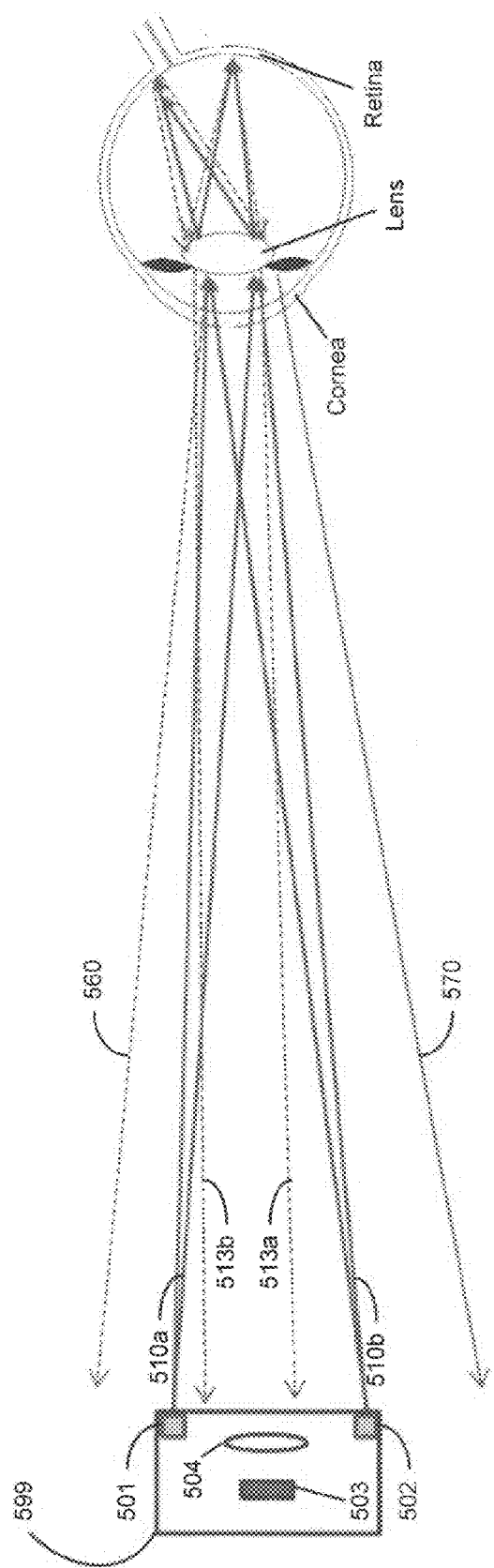
FIG. 5B shows a diagram of operation of the exemplary method described in FIG. 4A using retro-reflection of the eye and multiple light sources and one camera of an exemplary mobile device.

FIG. 5B shows a diagram of operation of the exemplary method described in FIG. 4A using retro-reflection of the eye and multiple light sources and one camera of the user device 599, e.g., such as a smartphone. The diagram of FIG. 5B shows reflected light beams 513*a* and 513*b* reflected by retroreflection based on incident light beams 510*a* and 510*b* produced by the light sources 501 and 502, respectively. The light path of the incident light beams 510*a* and 510*b* includes passing through the cornea and lens of the eye and becoming incident upon the retina. The light incident upon the retina can be retroreflected by the retina such that the light path of the retroreflected light passes again through the lens and cornea and directed towards its source, as shown by the retroreflected light beams 513*a* and 513*b*. The retroreflected light beams 513*a* and 513*b* can be captured by the camera 504. For example, some of the retroreflected light can be directed away from the user's device 599, as illustrated as retroreflected light 560 in the exemplary diagram of FIG. 5B. Also for example, some of the emitted light can be reflected from the iris, as represented in the diagram as iris reflections 570.

Figure 6A:
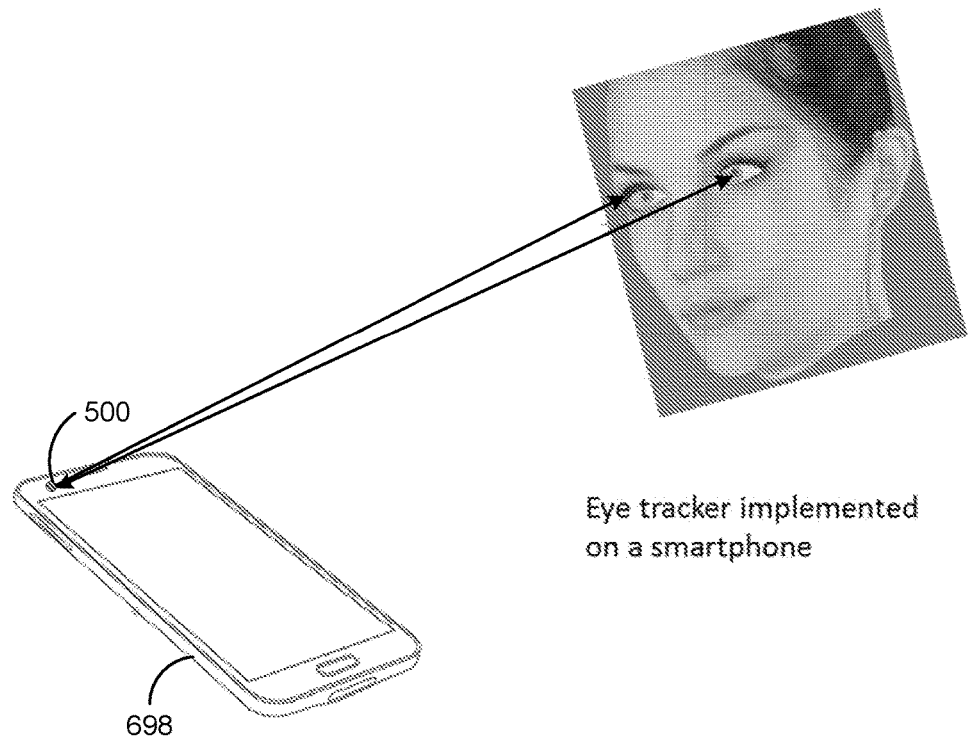
FIG. 6A shows a diagram of an exemplary eye tracking device of the disclosed technology implemented on a mobile smartphone device.

FIG. 6A shows a diagram of the eye tracking device 500 implemented on a mobile smartphone device 698.

Figure 6B:
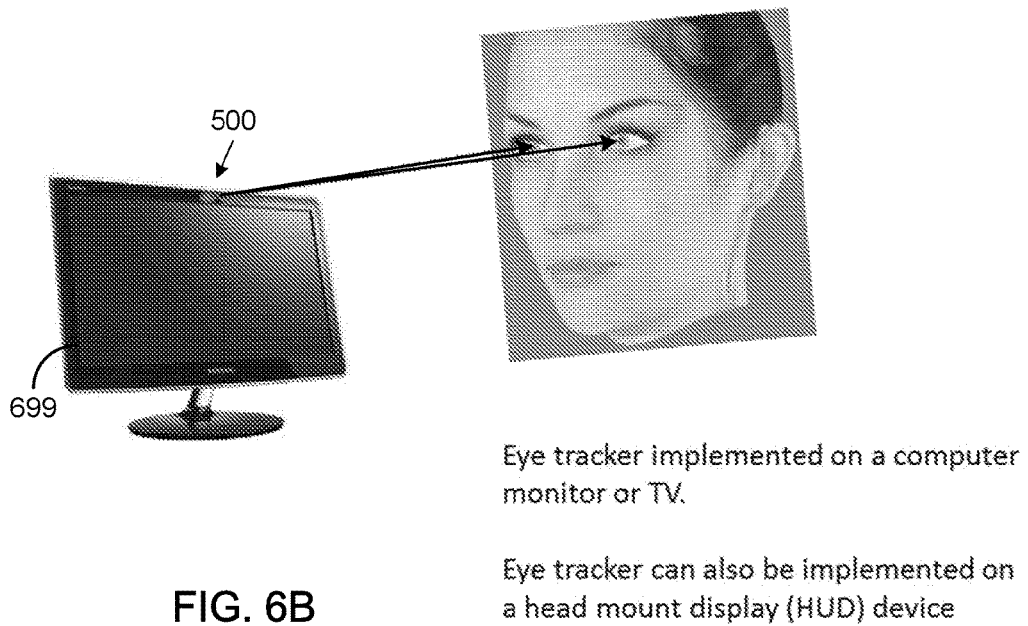
FIG. 6B shows a diagram of an exemplary eye tracking device of the disclosed technology implemented on a computer monitor or a television device.

FIG. 6B shows a diagram of the eye tracking device 500 implemented on a computer monitor or a television device 699.

In other examples, the disclosed eye tracking technology can be implemented on a head mount display (HUD) device, e.g., such as Google glass.

In some implementations, for example, the eye tracking unit 500 includes a display screen 515 configured on the same side of the exterior of the user device 599 that the light sources 501, 502 and 503 and the camera 504 are located. The display screen 515 can be communicatively coupled to the processing unit 505 and/or the memory unit 506. For example, the display screen 515 can be a display screen inherent to the user device 599.

Figure 7B:
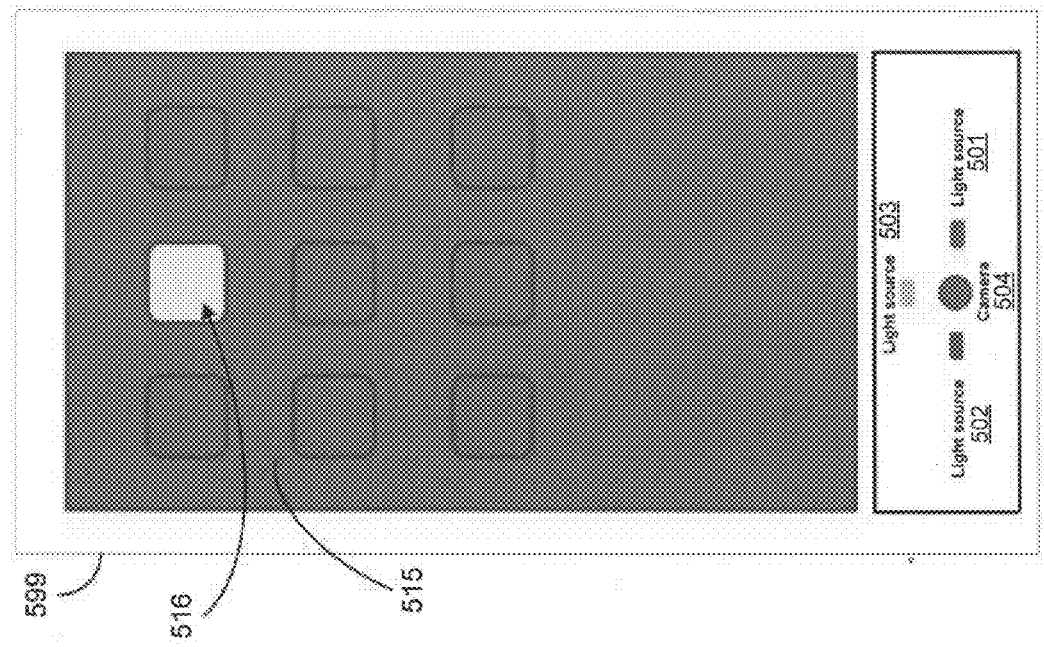
FIG. 7B shows a diagram of an exemplary eye tracking device of the disclosed technology used for operating a user device by detecting eye movement and/or blinking to control functions of the device.
Figure 7A:
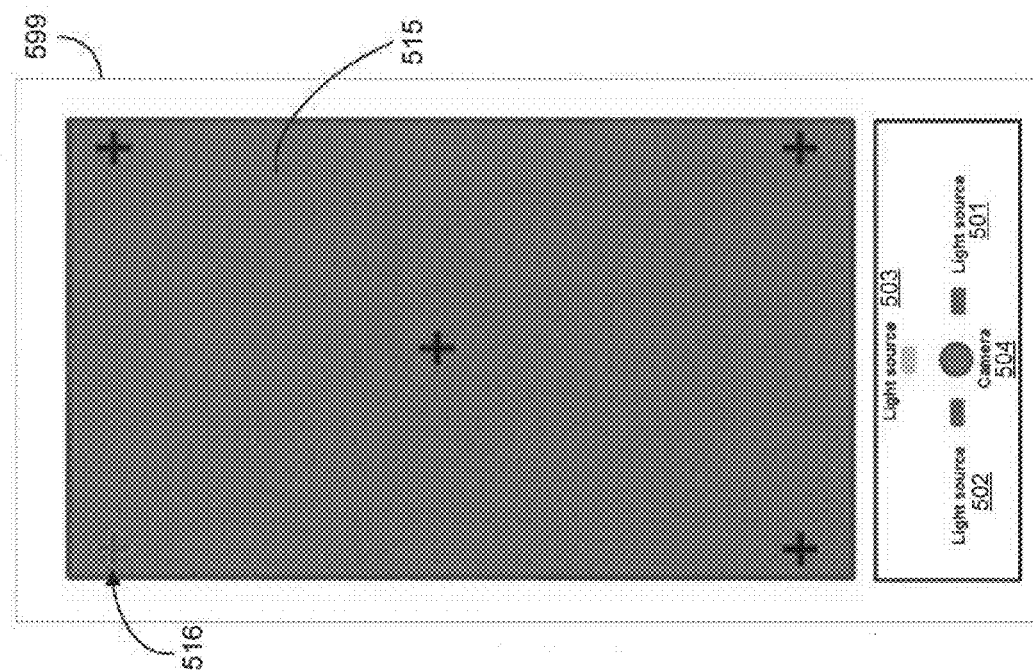
FIG. 7A shows a diagram of an exemplary eye tracking device of the disclosed technology used for calibration.

FIG. 7A shows a diagram of an exemplary configuration of the display screen 515 of the eye tracking unit 500 that can be used for calibration of the eye tracking unit 500. For example, a fixed location marker 516 is displayed, in which a calibration operation includes user focus watching one highlighted marker at a time and pushing a select button of the user device 599. The fixed location marker 516 can be moved to several locations on the display screen 515, exemplified in the four corners and center of the screen, in which the active marker is indicated in red. For example, the fixed location marker 516 can be shown several times and in the several locations to be displayed to carry out the calibration operation.

FIG. 7B shows a diagram of the eye tracking unit 500 including the display screen 515 and operated in any of a variety of applications in which eye movement is used as input data for the user device 599 in which the eye tracking unit 500 is implemented. For example, the eye tracking unit 500 can detect positional parameters of the user's eyes in user-performed operations, including, but not limited to, ocularly select buttons, icons or text 517 on the display screen 515 to implementing a program of the user device 599, e.g., such as a smartphone or tablet, among others. Additionally, for example, the disclosed eye tracking technology can use eye blinking, detected by the eye tracking unit 500, and utilize the blinking data, just like the eye movement data, to activate application functions of the user device 599.

Figure 8:
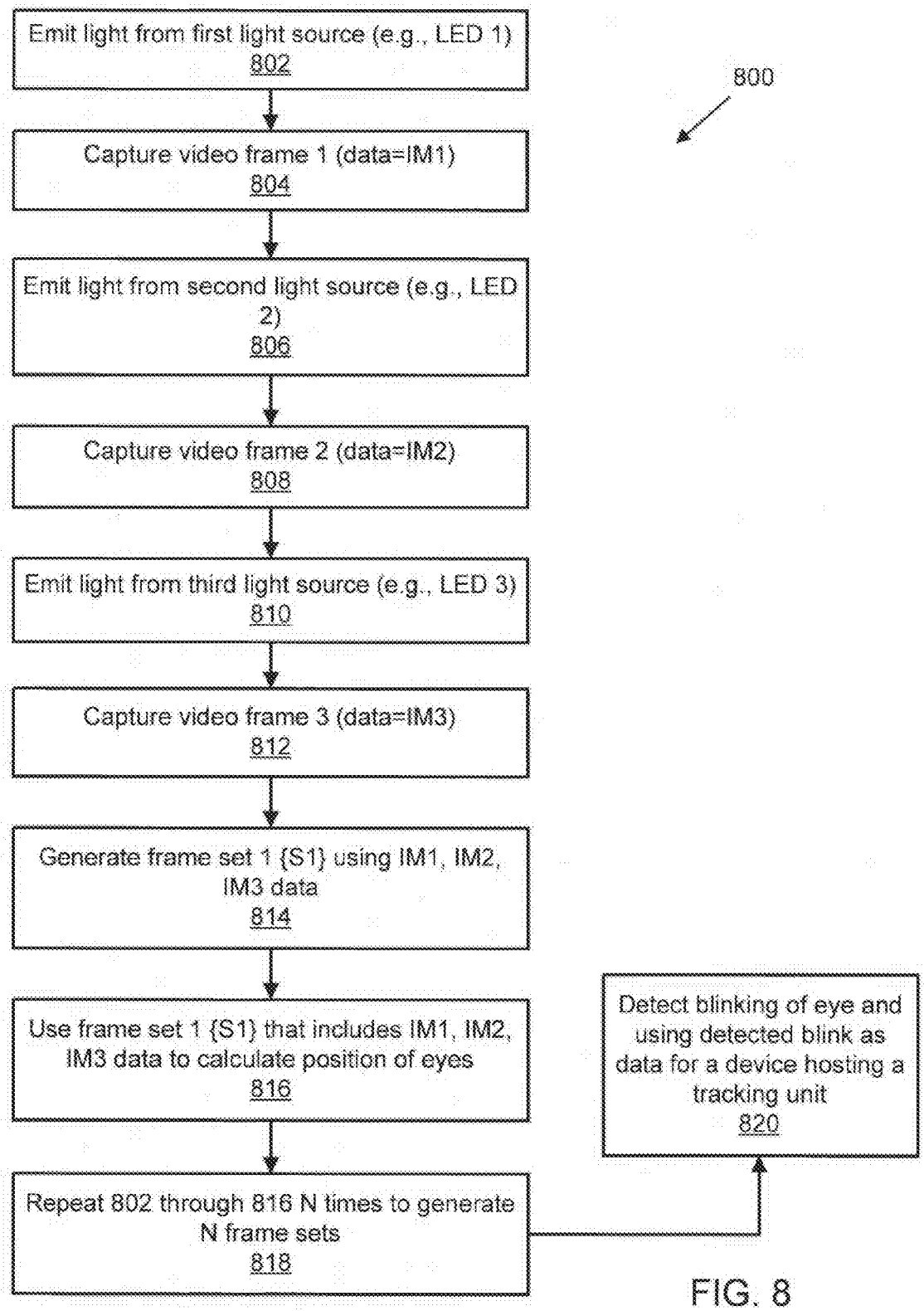
FIG. 8 shows a process diagram of an exemplary method to track the movement of an eye using a sequential light emission and capture using an exemplary tracking unit of the disclosed technology.

FIG. 8 shows a process diagram of an exemplary method 800 for tracking the movement of an eye using a sequential light emission and capture using the tracking unit 500. The method includes emitting a first light from the light source 501, e.g., such as an LED 1 (802), and capturing, using the camera 504, an image of the retroreflection of the first emitted light retroreflected by the eye in a first video frame (804). The method includes emitting a second light from the light source 502, e.g., such as an LED 2 (806), and capturing, using the camera 504, an image of the retroreflection of the second emitted light retroreflected by the eye in a second video frame (808). The method includes emitting a third light from the light source 503, e.g., such as an LED 2 (810), and capturing, using the camera 504, an image of the retroreflection of the third emitted light retroreflected by the eye in a third video frame (812). The first, second, and third video frames can be included in a frame set (e.g., frame set data 1 or $\{S_1\}$) (800) (814). The method includes using the first, second, and third video frame data of $\{S_1\}$ to calculate the position of the eye corresponding to an instance of time to emit the three lights and capture the three video frames (816). The method can includes repeating this process (e.g., n times) to generate multiple, sequential frame sets $\{S\}_n$ (818).

The method can also include detecting the blinking of the eye and using a detected blink as data for the device hosting the tracking unit 500 (820). For example, when an eye of the user has blinked, the retroflected light is disappeared, which would be detected over multiple frame data set, and it is a feature used to detect eye blinking. For example, multiple frame set data $\{S_n\}$ can be processed to determine the occurrence of an eye blinking event, the frequency of eye blinking events, the speed of the eye blinking, the duration of the eye blinking (e.g., how long the eye is shut), and which eye blinked (e.g., left or right eye blinked or both eyes blinked). These can all be used as input data to affect a function of the device (e.g., the machine state of a smartphone or computer).

Figure 9:
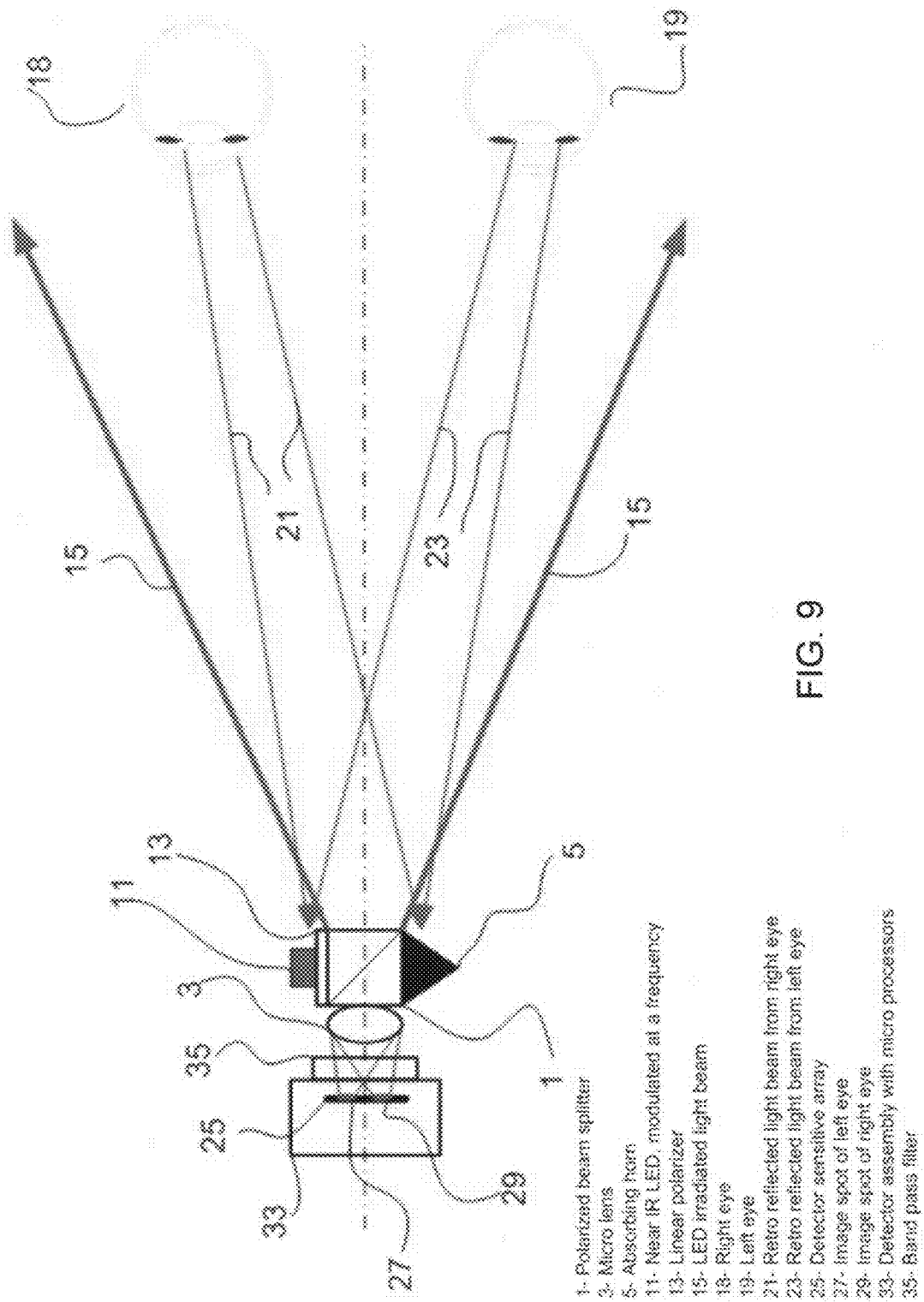
FIG. 9 shows a diagram of an exemplary eye tracking device of the disclosed technology used for detecting eye movement and/or blinking to control functions of a device.

FIG. 9 shows a diagram of an exemplary eye tracking device of the disclosed technology including a single sensor set with a prism and used for detecting eye movement and/or blinking to control functions of a device. In some implementations, the exemplary eye tracking device can operate as a high resolution 'eye mouse'. In this example, the exemplary eye tracking device can include a polarized beam splitter 1 optically coupled to a micro lens 3, in which the micro lens 3 is positioned or located between the polarized beam splitter 1 and a band pass filter 35 to optically filter the light that enters a photodetector module 33. The exemplary eye tracking device can include a light source (e.g., near infrared LED 11), which can be modulated at a particular frequency or frequencies, in which the light source 11 is optically coupled to the linear polarizer 13 that is optically coupled to the polarized beam splitter 1 to transmit a probe light (e.g., LED irradiated light beam 15) from the device that can be retroreflected by the eyes of the user. The photodetector module 33 can be structured to include a photodetector sensitive array 25 to detect the inputted light into the module 33, which can include retroreflected light by a user's eye, e.g., which is filtered by the band pass filter 35. For example, as shown in FIG. 9, the photodetector sensitive array 25 detects light at an image spot 29 corresponding to the retroreflected light beam 21 of the right eye 18 of the user and at an image spot 27 corresponding to the retroreflected light beam 23 of the left eye 19 of the user. The exemplary eye tracking device can include a processing unit communicatively coupled to the photodetector module 33 to process the photodetected signals on the photodetector sensitive array 25 as data. The processing unit can include a general purpose processor coupled to a memory unit to store the raw and processed data. The processing unit can be configured to execute methods to track the eye movements based on the detected retroreflected light signal data and control functions of the user device, e.g., including altering the display of the user device. In some implementations of the exemplary eye tracking device, a processing unit including a processor and memory unit of the user device is used to implement the data processing methods of the disclosed technology.

Figure 10:
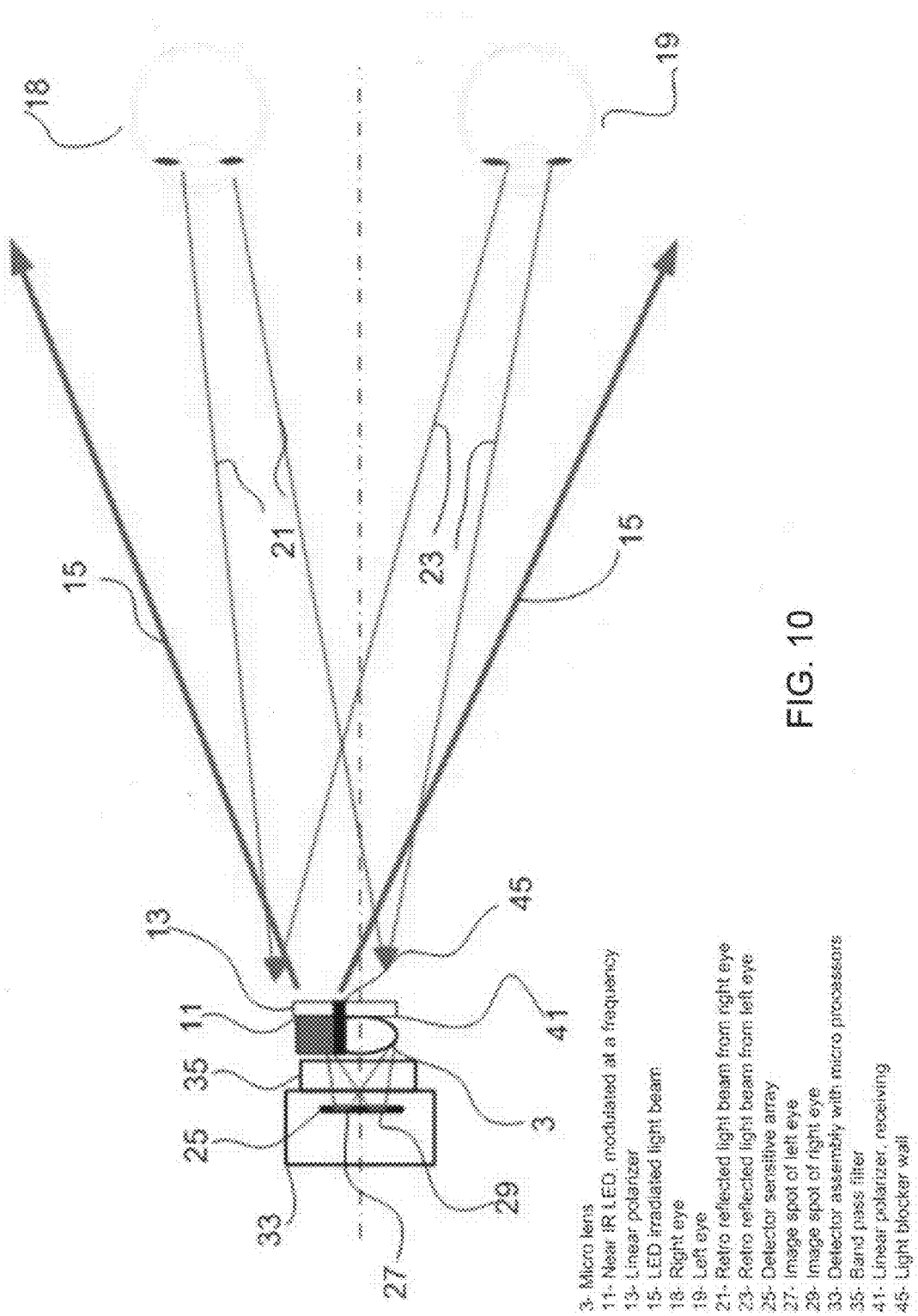
FIG. 10 shows a diagram of an exemplary eye tracking device of the disclosed technology including a single sensor set with a light blocking barrier and used for detecting eye movement and/or blinking to control functions of a device.

FIG. 10 shows a diagram of an exemplary eye tracking (eye mouse) device of the disclosed technology including a single sensor set with a light blocking barrier and used for detecting eye movement and/or blinking to control functions of a device. In this example, the exemplary eye tracking device can include a light source (e.g., near infrared LED 11), which can be modulated at a particular frequency or frequencies, in which the light source 11 is optically coupled to the linear polarizer 13 to transmit a probe light (e.g., LED irradiated light beam 15) from the device that can be retroreflected by the eyes of the user. The exemplary eye tracking device can include a linear (receiving) polarizer 41 optically coupled to a micro lens 3 and configured near but separated from the light source 11 and linear (transmitting) polarizer 13 by a light blocker wall or barrier 45. The exemplary light tracking device a band pass filter 35 configured behind the micro lens 3 to optically filter the light that enters a photodetector module 33. The photodetector module 33 can be structured to include a photodetector sensitive array 25 to detect the inputted light into the module 33, which can include retroreflected light by a user's eye, e.g., which is filtered by the band pass filter 35. For example, as shown in FIG. 9, the photodetector sensitive array 25 detects light at an image spot 29 corresponding to the retroreflected light beam 21 of the right eye 18 of the user and at an image spot 27 corresponding to the retroreflected light beam 23 of the left eye 19 of the user. The exemplary eye tracking device can include a processing unit communicatively coupled to the photodetector module 33 to process the photodetected signals on the photodetector sensitive array 25 as data. The processing unit can include a general purpose processor coupled to a memory unit to store the raw and processed data. The processing unit can be configured to execute methods to track the eye movements based on the detected retroreflected light signal data and control functions of the user device, e.g., including altering the display of the user device. In some implementations of the exemplary eye tracking device, a processing unit including a processor and memory unit of the user device is used to implement the data processing methods of the disclosed technology.

Figure 11A:
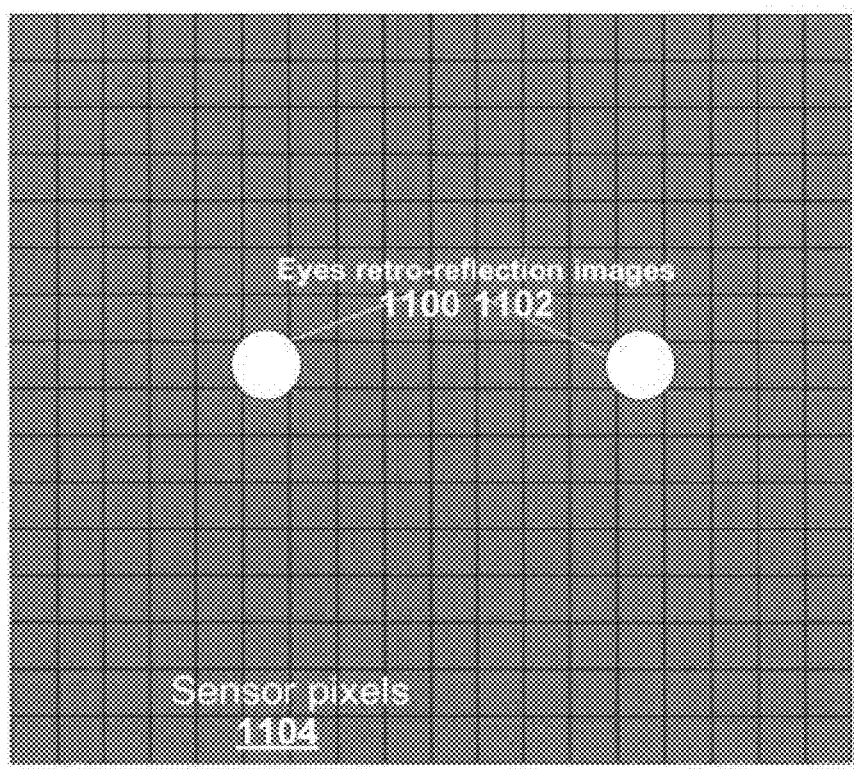
FIG. 11A shows a diagram depicting exemplary retro-reflection images on the exemplary sensor surface of an exemplary eye mouse device detected from retroreflected light by the eyes of a user of the exemplary device.
Figure 11B:
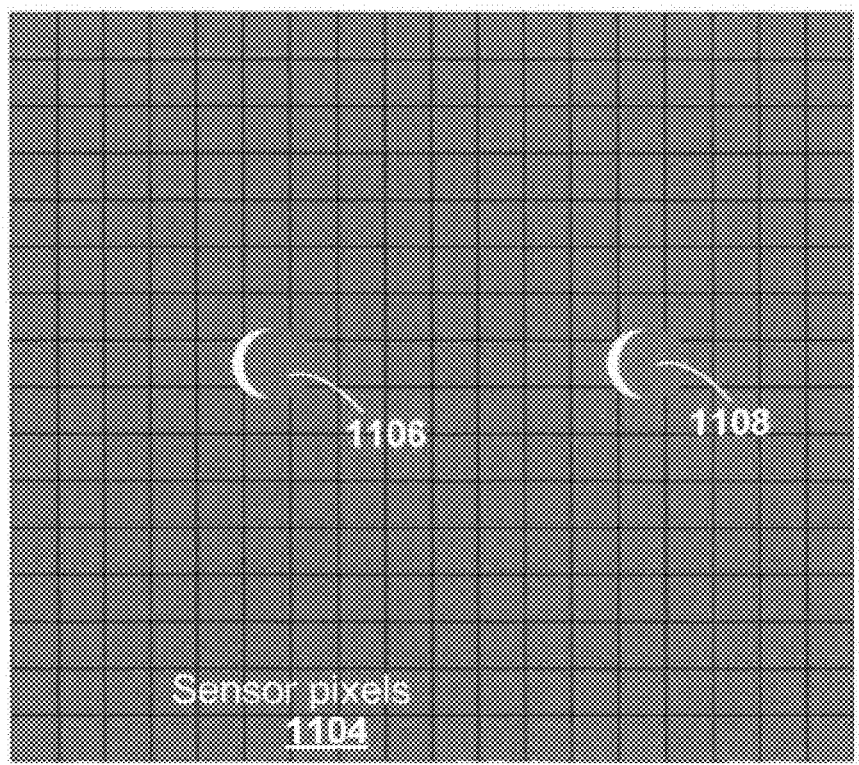
FIG. 11B shows a diagram depicting the exemplary retro-reflection images on the exemplary sensor surface when the user's eyes move.

FIG. 11A shows a diagram depicting exemplary retroreflection images 1100 and 1102 on an exemplary sensor surface 1104 (e.g., substantially similar to photodetector sensitive array 25) of an exemplary eye mouse device, such as those shown in FIGS. 9 and 10, in which the images are detected from retroreflected light by the eyes of a user of the exemplary device. FIG. 11B shows a diagram depicting exemplary retro-reflection images 1106 and 1108 on the exemplary sensor surface when the user's eyes move, such that the image differential can generate tracking signals using a processing unit of the exemplary device.

Figure 12:
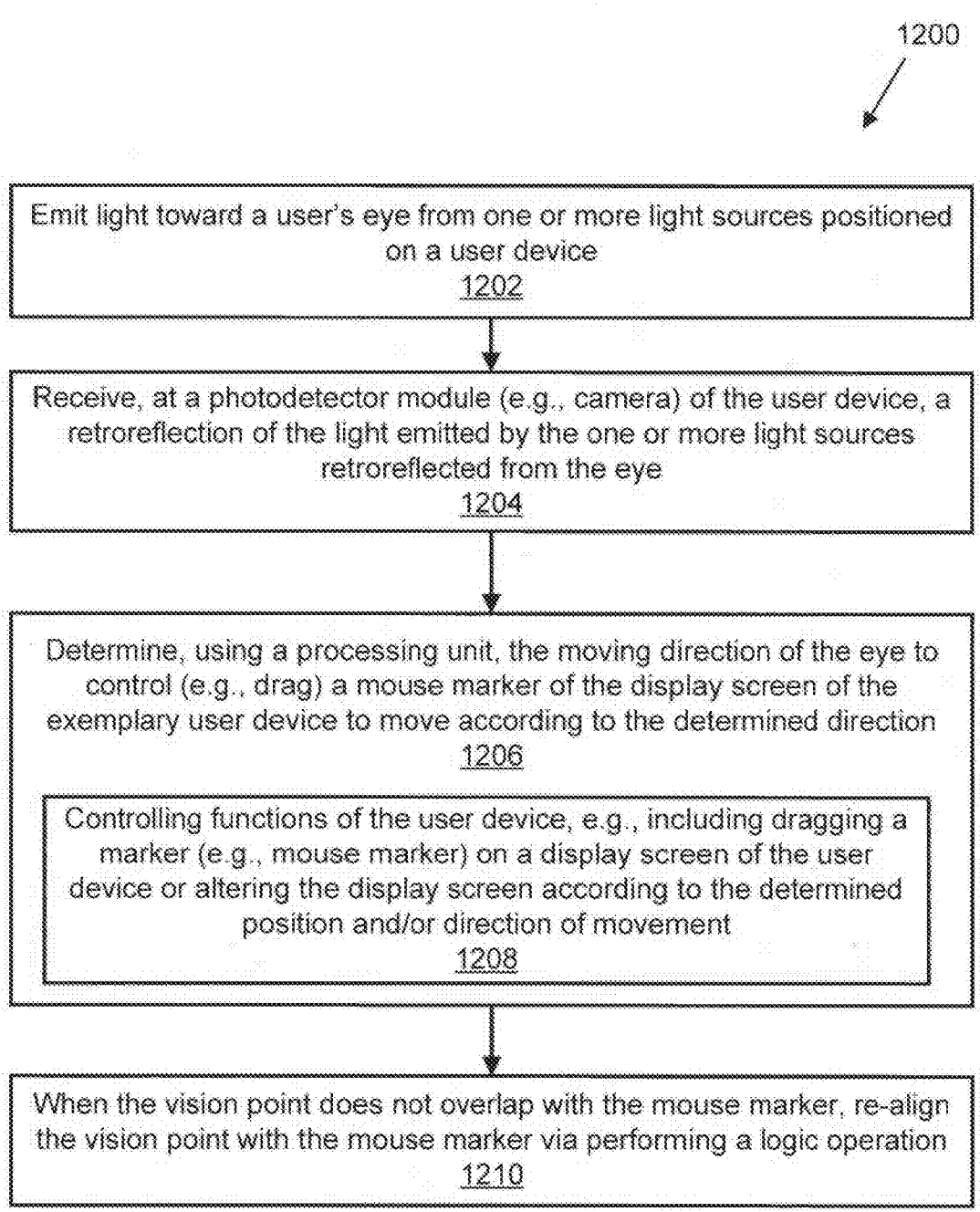
FIG. 12 shows a process diagram of an exemplary method for tracking the movement of an eye and controlling a mouse marker on a display screen using the tracked eye movements.

FIG. 12 shows a process diagram of an exemplary method 1200 for tracking the movement of an eye and controlling a mouse marker on a display screen using the tracked eye movements. The exemplary method can include a process to emit light toward a user's eye from one or more light sources configured in a user's device including an eye tracking device of the disclosed technology (1202). The user's device can include, but is not limited to, a smartphone, a tablet, a picture or video camera, a computer monitor, or a laptop computer. The method can include a process to receive, at a photodetector module of the eye tracking device of the disclosed technology in the user's device, a retroreflection of the light emitted by the one or more light sources, where the retroreflected light was retroreflected by an eye (e.g., the left eye, the right eye, and/or both eyes) of the user (1204). The method can include a process to determine, using a processing unit of the eye tracking device of the disclosed technology or a processing unit existing on the user device, a position and/or direction of movement of the eye(s) based on the received/detected retroreflected light (1206). In some implementations, the process to determine the position and/or movement direction of the eye can include controlling functions of the user device, e.g., including dragging a marker (e.g., mouse marker) on a display screen of the user device or altering the display screen according to the determined position and/or direction of movement (1208). When the vision point does not overlap with the mouse marker, the method can include re-aligning the vision point with the mouse marker via performing a logic operation (1210).

Figure 13:
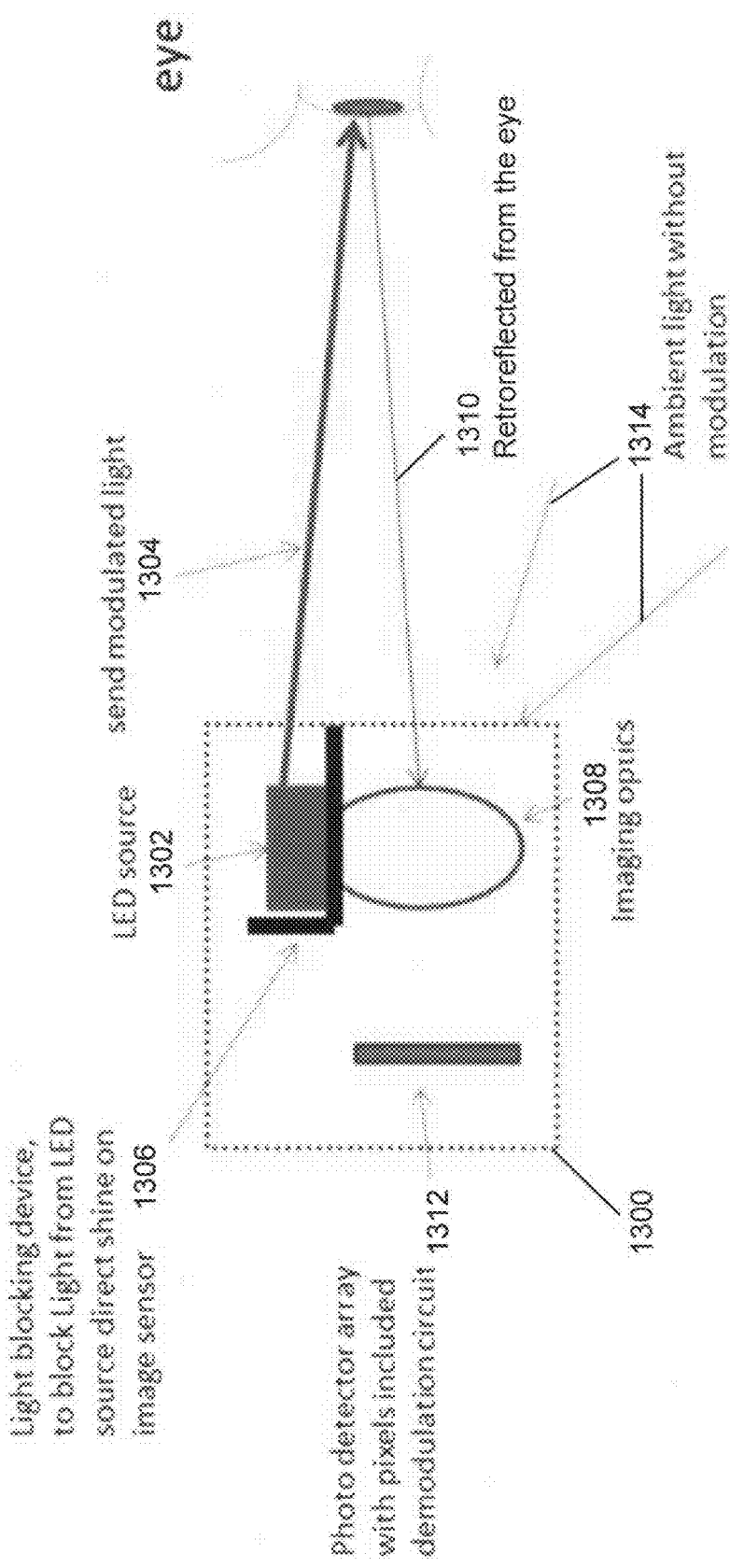
FIG. 13 shows a diagram of an exemplary eye tracking sensor device of the disclosed technology with modulated illumination light emitter and detection modules.

FIG. 13 shows a diagram of an exemplary eye tracking sensor 1300 of the disclosed technology with modulated illumination light and detection units. The exemplary eye tracking sensor device 1300 can include a light source unit (e.g., LED light source) 1302 to emit modulated light 1304 toward a user. The exemplary eye tracking sensor device 1300 can include one or more light blocking devices 1306 such as walls or barriers configured or disposed proximate the light source 1302 to block light from the light source 1302 from shining/illuminating on an image sensor of the exemplary eye tracking sensor device. The exemplary eye tracking sensor device 1300 can include imaging optics 1308 (e.g., one or more micro lens(es)) to receive and input light into the device 1300, in which the imaging optics 1308 can be configured or disposed proximate the light blocking wall 1306 (e.g., that prevents the emitted light from the light source unit 1302 from directly entering the imaging optics 1308). The exemplary eye tracking sensor device 1300 can include a photodetector array 1312 to detect light transmitted through the imaging optics 1308. In implementations of the exemplary eye tracking sensor device 1300, the light source 1302 is configured disposed to emit modulated light 1304 (e.g., at one or more frequencies) that can be retroreflected 1310 from the eye and be received by the photodetector array 1312 via the imaging optics 1308 of the exemplary eye tracking sensor device 1300. For example, the photodetector array 1312 can be configured to include pixels and a demodulation circuitry to discern between light of the modulated frequency or frequencies emitted by the light source from other light without such modulation (e.g., such as ambient light 1314 in the surrounding environment). In some implementations, the exemplary eye tracking sensor device can be communicatively coupled with a processing unit of a user device.

Figure 14:
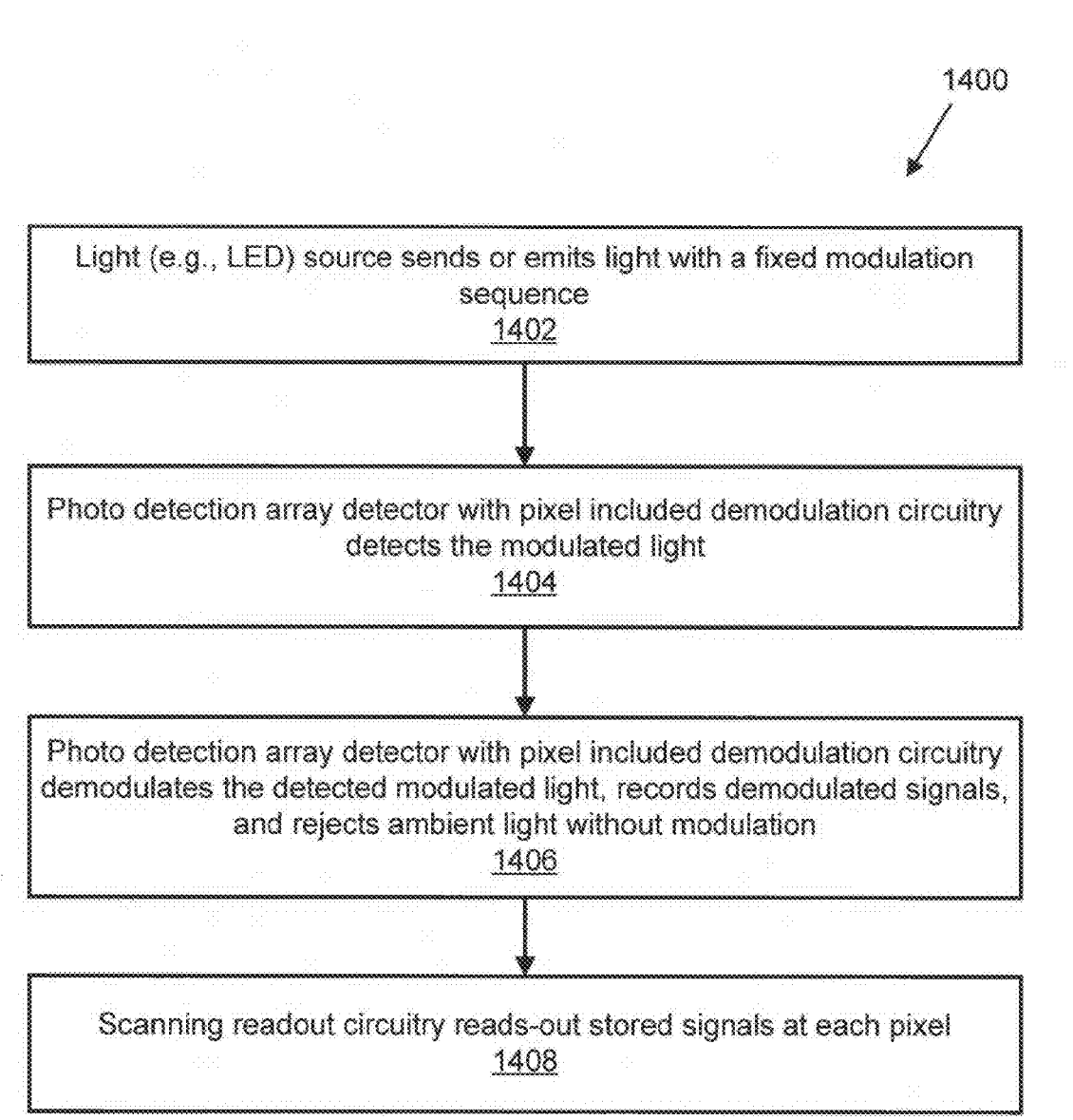
FIG. 14 shows a process diagram of an exemplary method for detecting modulated eye tracking sensor signals.

FIG. 14 shows a process diagram of an exemplary method (1400) for detecting modulated eye tracking sensor signals. The exemplary method (1400) can include a process to emit light (e.g., LED light) with a fixed modulation from a light emitting unit (e.g., light emitting unit 1302) of an eye tracking sensor device (e.g., eye tracking sensor device 1300) of the disclosed technology, e.g., such as the eye tracking sensor device 1300 as shown in FIG. 13 (1402). The exemplary method (1400) can include a process to detect the modulated light at a photodetector array including a pixel included demodulation circuitry (1404). The method 1400 can include a process to demodulate the detected modulated light, in which only demodulated signals are recorded and stored (e.g., in a memory, which can be configured in the demodulation circuitry), and light not of the modulated frequency (or frequencies) are rejected (1406). The method (1400) can include a process to read out the stored signals for each pixel, e.g., using a scanning readout circuitry coupled to or included in the demodulation circuitry.

Figure 15:
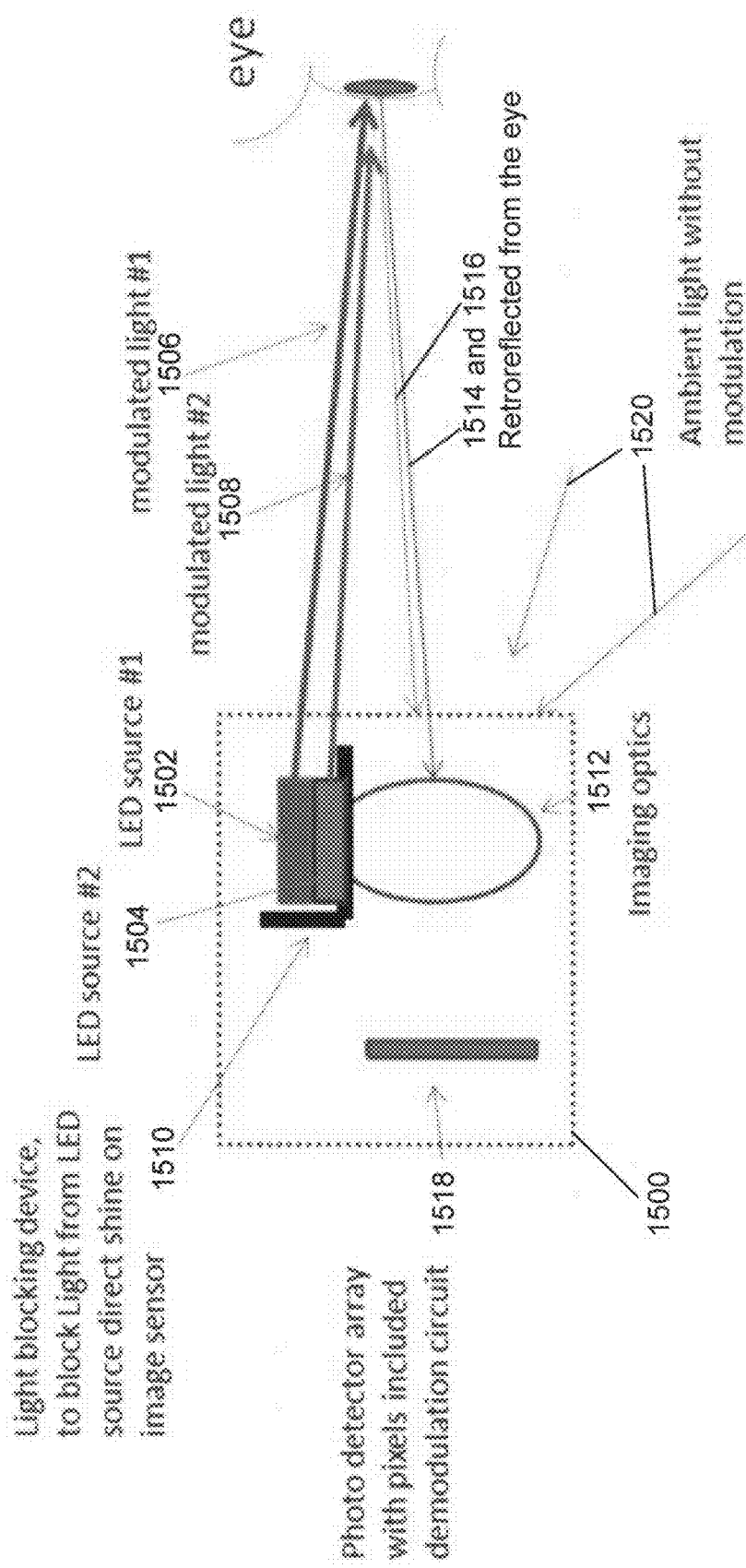
FIG. 15 shows a diagram of another exemplary eye tracking sensor device of the disclosed technology with multiple modulated illumination light emitter and detection modules.

FIG. 15 shows a diagram of another exemplary eye tracking sensor 1500 of the disclosed technology with modulated illumination light and detection units. The exemplary eye tracking sensor device 1500 of FIG. 15 can include a multiple light source unit 1502 and 1504 (e.g., LED light source #1 and LED source #2) to emit multiple modulated light 1506 and 1508 (e.g., modulated light #1 and modulated light #2) toward a user. The exemplary eye tracking sensor device 1500 can include one or more light blocking devices 1510 such as walls or barriers configured or disposed proximate the light sources 1502 and 1504 to block light emitted from the light sources 1502 and 1504 from shining/illuminating on an image sensor of the exemplary eye tracking sensor device 1500. The exemplary eye tracking sensor device 1500 can include imaging optics 1512 (e.g., one or more micro lens(es)) to receive and input light into the device 1500, in which imaging optics 1512 can be configured or disposed proximate the light blocking wall 1510 to prevent the emitted light 1506 and 1508 from the multiple light source unit from directly entering the imaging optics 1512. The exemplary eye tracking sensor device 1500 can include a photodetector array 1518 to detect the inputted light transmitted through the imaging optics 1512. In implementations of the exemplary eye tracking sensor device 1500, the multiple light sources 1502 and 1504 are configured to emit multiple modulated light beams 1506 and 1508 (e.g., at different modulated frequencies) that can be retroreflected 1514 and 1516 from the eye and be received by the photodetector array 1518 via the imaging optics 1512 of the exemplary eye tracking sensor device 1500. For example, the photodetector array 1518 can be configured to include pixels and demodulation circuitry to discern between light rays or beams 1506 and 1508 of the modulated frequencies emitted by the multiple light source units 1502 and 1504 from other lights 1520 without such modulation (e.g., such as ambient light in the surrounding environment). In some implementations, the exemplary eye tracking sensor device 1500 can be communicatively coupled with a processing unit of a user device.

Figure 16:
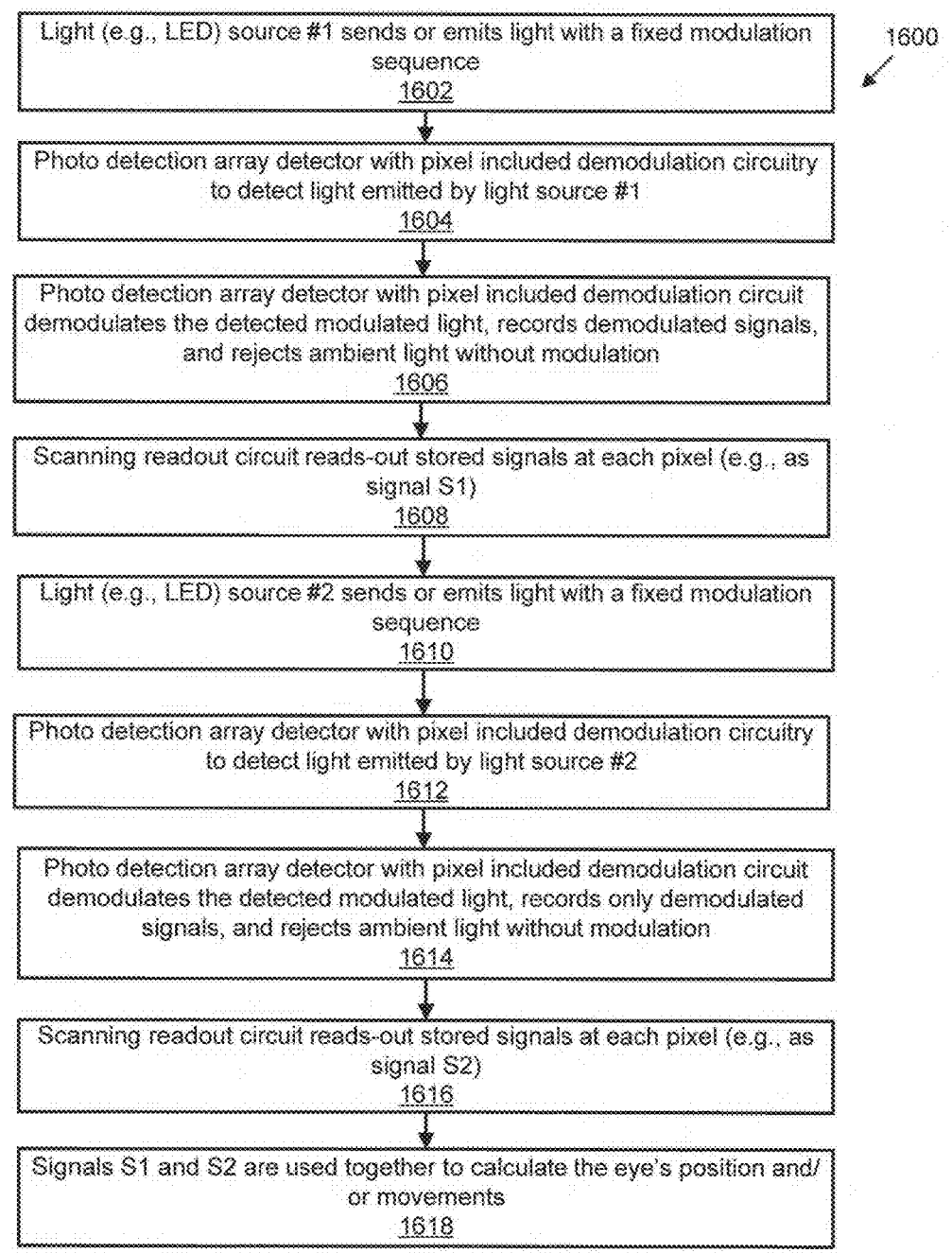
FIG. 16 shows a process diagram of an exemplary method for detecting multiple modulated eye tracking sensor signals.

FIG. 16 shows a process diagram of an exemplary method (1600) for detecting multiple modulated eye tracking sensor signals. The exemplary method (1600) can include a process to emit a first light beam (e.g., LED light) with a fixed modulation from a first light emitting source (e.g., LED light source) of an eye tracking sensor device of the disclosed technology, e.g., such as that shown in FIG. 15 (1602). The exemplary method (1600) can include a process to detect the first modulated light beam at a photodetector array including pixel-included demodulation circuitry (1604). The method can include a process to demodulate the detected first modulated light, in which only demodulated signals are recorded and stored (e.g., in a memory, which can be configured in the demodulation circuitry), and light not of the first modulated frequency (or frequencies) are rejected (1606). The method (1600) can include a process to read out the stored signals (signal S1) corresponding to the first modulated light for each pixel, e.g., using scanning readout circuitry coupled to or included in the demodulation circuitry (1608). The exemplary method (1600) can include a process to emit a second light beam (e.g., LED light) with a fixed modulation from a second light emitting source (e.g., LED light source) of an eye tracking sensor device of the disclosed technology, e.g., such as that in FIG. 15 (1610). The exemplary method (1600) can include a process to detect the second modulated light beam at a photodetector array including a pixel-included demodulation circuitry (1612). The method (1600) can include a process to demodulate the detected second modulated light, in which only demodulated signals are recorded and stored (e.g., in a memory, which can be configured in the demodulation circuitry), and light not of the second modulated frequency (or frequencies) are rejected (1614). The method (1600) can include a process to read out the stored signals corresponding to the second modulated light for each pixel, e.g., using scanning readout circuitry coupled to or included in the demodulation circuitry (1616). The signals (S1 and S2) corresponding to the first and second modulated light for each pixel can be used together to calculate the eye's position and/or movements (1618). The method (1600) can include implementing the emitting, detecting and demodulating, and read-out processes of the exemplary first and second modulated light sequentially, as shown in FIG. 16, or concurrently, as shown in FIG. 17.

Figure 17:
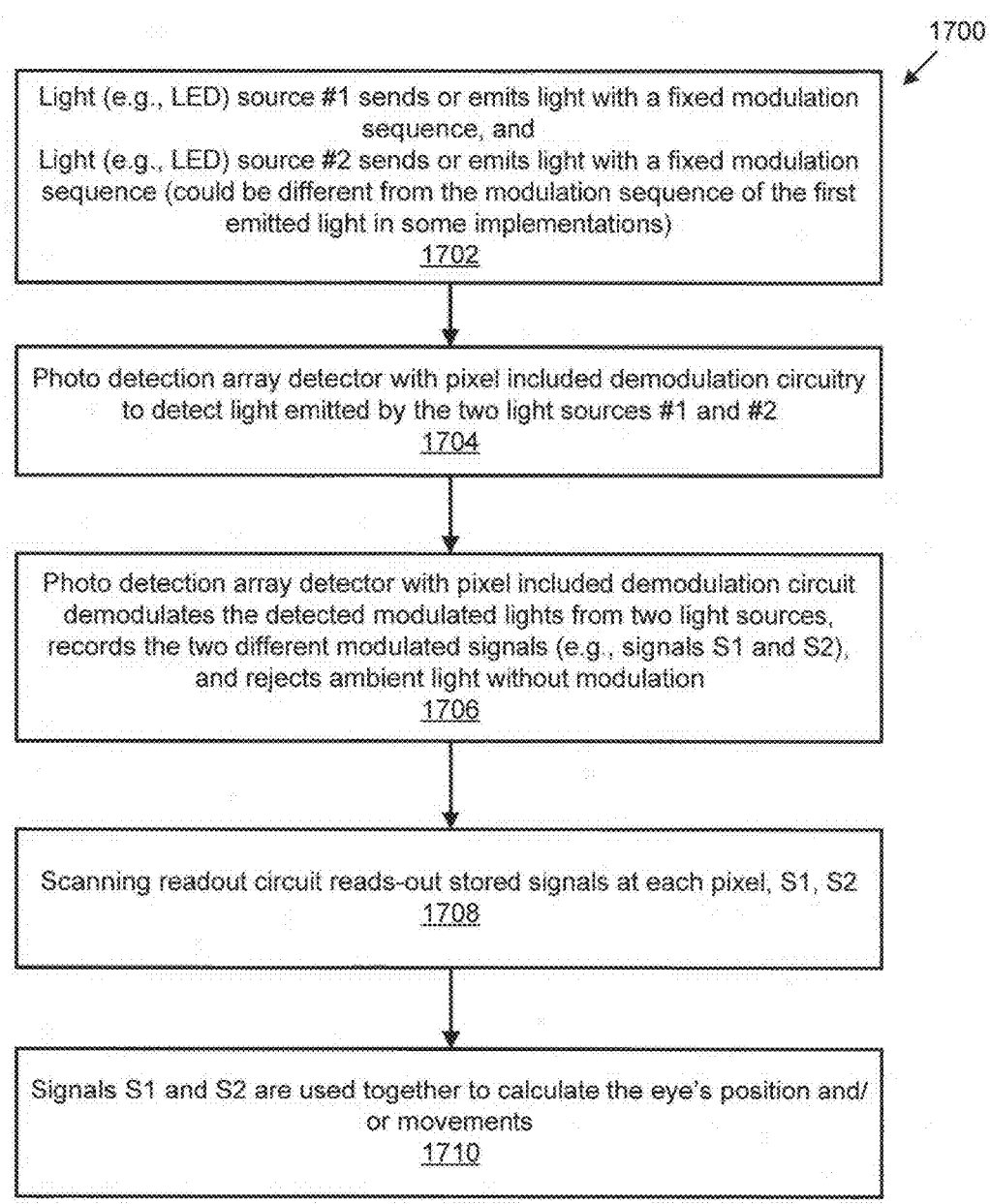
FIG. 17 shows a process diagram of an exemplary method for concurrently detecting multiple modulated eye tracking sensor signals.

FIG. 17 shows a process diagram of an exemplary method (1700) for concurrently detecting multiple modulated eye tracking sensor signals. For example, two different light sources that emit lights in different wavelengths are used to emit two lights of different wavelengths (1702), e.g., in which the first light source emits light at wavelengths >850 nm, e.g., in some examples at 940 nm, and in which the second light source emits light at wavelengths <850 nm, e.g., at 780 nm. For example, the exemplary wavelengths can be used because the eye crystal can have different absorption on the two different wavelengths, whereas the human skin and other backgrounds have little difference to these two wavelength. The method (1700) includes using a photo detection array detector (e.g., one with pixel included demodulation circuitry) to detect light emitted by the two light sources (1704). Photo detection array detector with pixel included demodulation circuit demodulates the detected modulated lights from two light sources, records the two different modulated signals (e.g., signals S1 and S2), and rejects ambient light without modulation (1706). By comparing the S1 and S2 signals, the back ground signals can be further rejected. The method (1700) can include a process to read out the stored signals corresponding to the first and second modulated lights for each pixel, e.g., using scanning readout circuitry coupled to or included in the demodulation circuitry (1708). The signals (S1 and S2) corresponding to the first and second modulated light for each pixel can be used together to calculate the eye's position and/or movements (1710). In other implementations, the two light sources can also be of the same wavelength and/or same modulation frequency but with a well defined phase difference, such as a phase difference of $\pi$, so that the processor can process the signals to extract information on the eye position or movement.

Functioning like a regular mouse, a proposed "eye mouse" module controls the computer cursor on a display by tracking and detecting the user's eye gaze. In some implementations, when a user slightly rotates or moves a mobile device, or rotates or moves his/her head, or rotates/moves the mobile device while rotating/moving the head, the cursor is continuously or actively moved to a desired location of the user. Hence, the user may regard the mobile device as a regular mouse in such applications.

When operating an eye mouse module, which is integrated with a mobile device, light sources (which is part of the eye mouse module) on the mobile device can project light towards user. The retroreflected light from user's eyes return to the light sources with a small amount of divergence. However, the face of the user and other surfaces can scatter the light from the light sources and the scattered light can return to the light sources. Assuming eye pupil aperture is 3 mm in diameter, and the face and other surfaces have a total area of about 5000 times of the eye pupil area. This example means that only 1/5000 light returned to the light sources may be useful, which represents a serious problem for detecting the useful signal. In some embodiments, an eye mouse module is configured with a self-cancellation structure to reject background signals due to scattering from face and other object surfaces, so that only eyes or similar optics can be tracked while operating the eye mouse.

FIG. 18A shows a diagram of an exemplary eye mouse module 1800 which includes eye sensor mechanism and a self-cancellation structure. Note that eye mouse module 1800 is typically located on a device including a display screen. In this exemplary implementation, two groups of light sources in eye mouse module 1800 are used to facilitate detecting the eye pupil. More specifically, first group of light sources 1804 is placed close to the receiving sensor 1810 and the axis of lens 1808. Light sources 1804 may be referred to as the "co-axis light sources." The other group of light sources 1806 is placed further away from the axis of lens 1808. Light sources 1806 may be referred to as the "reference light sources." Typically, the distance between reference light sources 1806 and the lens 1808 may be set to about 5 mm. The light beams from light sources 1804 and 1806 are then projected toward the user. Each of the first and second groups of light sources 1804 and 1806 can include a single light source, such as an LED or multiple light sources, such as multiple LEDs.

When the user holds the device that includes the eye mouse module by the hand, the light power projected on the eye pupil 1802 is significantly less than (e.g., only about 1/5000) the light power that is projected on the user's face 1812 and other surfaces such as user's shoulder. The retroreflected light from the user's eyes may be distributed within a limited area (e.g., ~10 mm diameter aperture area at 600 mm distance) with the light source at the center of the aperture. The light scattered from the face and other surfaces is typically distributed into a much larger area, which may be described by a half globe if Lambert scattering model is used (e.g., $2\pi R^2$ or 25100~2262000 mm$^2$). Note that when the receiving lens 1808 has an aperture smaller than the retroreflected light beam size, the contrast between the retroreflected light and the scattered light is typically only 0.64~5.8. This low ratio means that the sensor 1810 has to have multiple elements. For example, when the sensor has N detector elements, the contrast can be improved by N times at the eye image location.

The design illustrated in FIG. 18A provides a technique to improve the eye detection contrast without increasing the number of sensor elements. In particular implementations, the two groups of light sources 1804 and 1806 can be of similar wavelengths and substantially the same spatial power distribution. This can be realized by adjusting the drive current of light sources 1804 and 1806. The two groups of light sources 1804 and 1806 can be modulated with substantially the same frequency and same modulation depth. However, the modulations performed on the two light sources have a phase difference ~180°. Note that the received scattered light from human face and other scattering surfaces include the scattered light of both light sources 1804 and light sources 1806. Because of the modulation phase difference of ~180°, the scattered light from these two sources are substantially cancelled out each other, and the remaining portion of the scattered light constitutes a stable power which generates DC signals. In some implementations, a DC-rejection filter circuitry is used to filter these high DC ratio signals. Moreover, the retroreflected light from light sources 1804 and 1806 typically has a very small divergence angle, and the configuration illustrated in FIG. 18A allows sensor 1810 to receive much more retroreflected light from co-axis light sources 1804. As a result, the received AC signal is primarily from the retroreflection light of the co-axis light sources 1804. This result is referred to as "self-cancellation."

Further referring to FIG. 18A, the output signals from sensor 1810 are coupled to a processing unit 1814 of the eye mouse module, which is operable to run programs to process the AC signals generated by sensor 1810 to determine a point of gaze of the eye of the user on a display 1816. For example, the processing unit 1814 can determine the point of gaze based on the retroreflected light corresponding to the co-axis light sources 1804 and the reference light sources 1806. In some embodiments, the processing unit 1814 can determine the point of gaze based primarily on the retroreflected light corresponding to the co-axis light sources 1804. The processing unit 1810 can then display or update the display of a cursor on display 1816 based on the determined point of gaze. Note that as the eye mouse module continuously or actively tracks the relative movement (both linear and rotational) between display 1816 and the eye of the user 1802, the processing unit continuously or actively updates the positions of the cursor on display 1816 based on changing points of gaze of the eye.

Figure 18B:
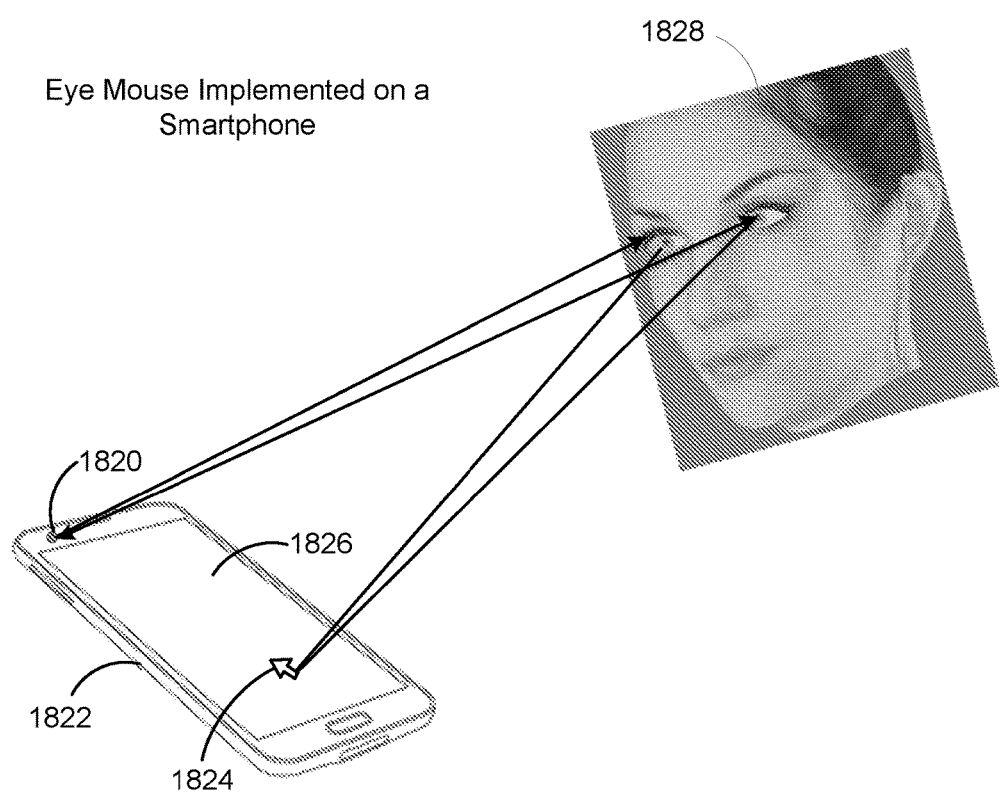
FIG. 18B shows a diagram of an exemplary eye mouse device integrated with a smartphone.

FIG. 18B shows a diagram of an exemplary eye mouse module 1820 integrated with a smartphone 1822 which displays a cursor 1824 on the display screen 1826 based on the determined point of gaze of user 1828.

Figure 19A:
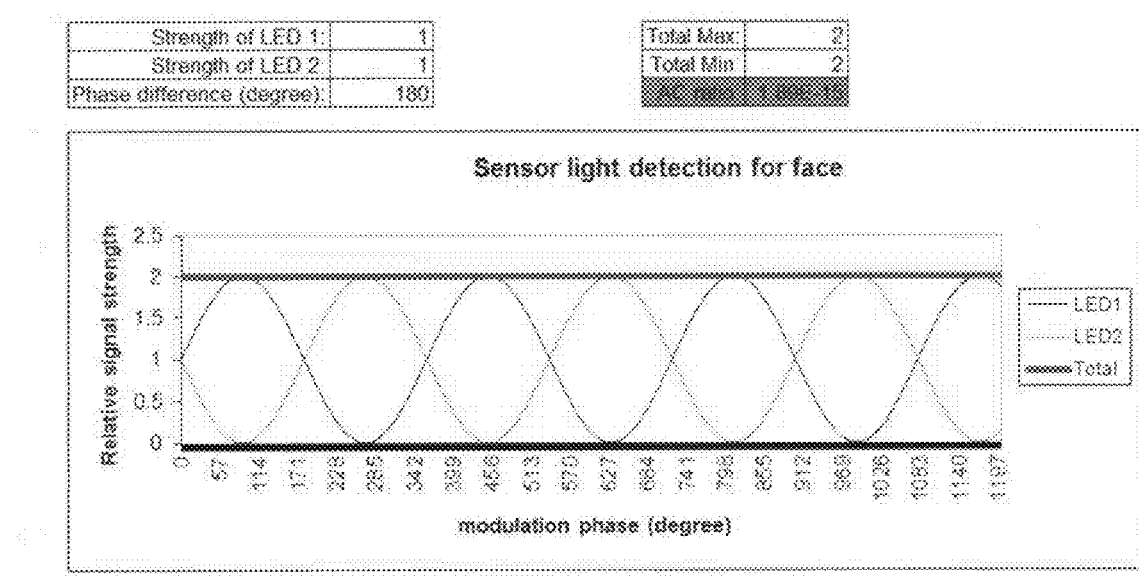
FIG. 19A shows a simulation result of an exemplary eye mouse module using the self-cancellation structure when the two groups of light sources are perfectly matched.

FIG. 19A shows a simulation result of an exemplary eye mouse module using the self-cancellation structure when the two groups of light sources are perfectly matched. In this embodiment, the two perfectly-matched light sources have the same strength, the same modulation profile and an opposite phase. Moreover, the scattering light from the face and other surfaces has mostly an DC output which is rejected by the filter circuitry. As a result, the detected AC signal component substantially corresponds to the eyes. It is observed that the face and other scattering surface cause a 41% increase of probe light noise. This is generally negligible comparing with the noise from the ambient background light.

Figure 19B:
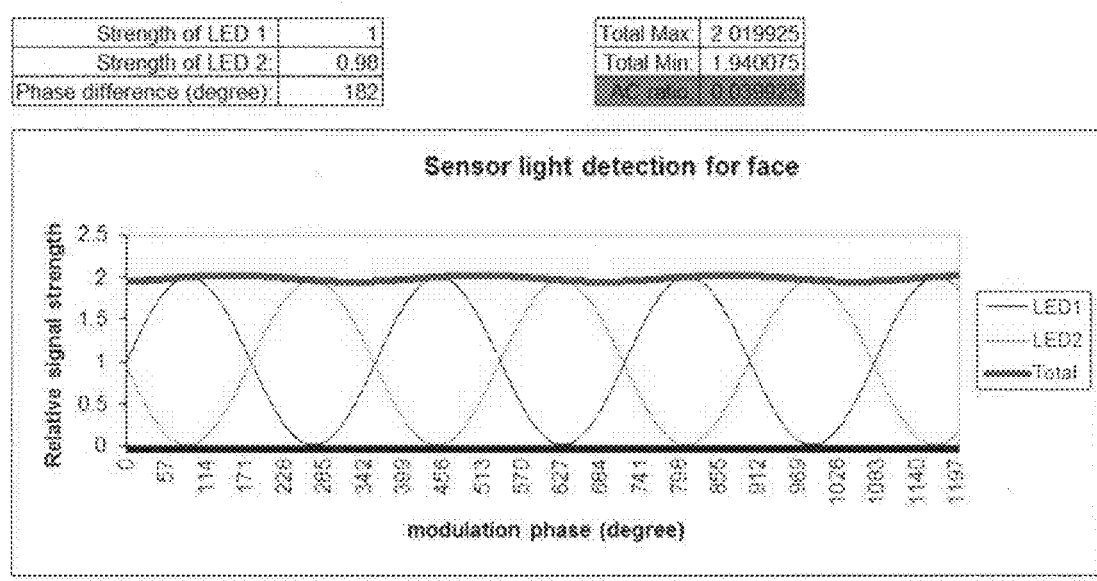
FIG. 19B shows a simulation result of an exemplary eye mouse module using the self-cancellation structure when the two groups of light sources are matched with a small amount of difference.

FIG. 19B shows a simulation result of an exemplary eye mouse module using the self-cancellation structure when the two groups of light sources are matched with a small amount of difference. In this example, the two light source has a 2% difference in strength, and the modulation phase difference is 178° instead of 180°. The simulation result shows that such a design achieved ~25 times signal to background contrast improvement, or ~18 times SNR improvement.

Note that using the design shown in FIG. 19A and FIG. 19B, the pupil size change can be conveniently and reliably detected by calibrating the received AC signal component with respect to the outputs of the light sources and the ambient light strength. More specifically, the retroreflection signal intensity change can be used to determine the pupil size change by measuring the received retroreflection signal strength change or by directly counting number of the pupil image occupied sensor elements. Moreover, the received retroreflection signal can also be used to determine whether a person is looking at screen and which region on the screen the person is looking at.

Note that the system does not need to compare between two frames to reject background in order to generate the eye tracking signals. Instead, the eye tracking signals are generated by sensor 1810 in real time. This is very useful especially during slow frame rate sensing. Further, the proposed eye mouse structure can reduce the requirement on number of detector elements by a factor of ~18 or better. For example, a 10×20 sensor of self-cancellation eye mouse module can achieve better result than 40×80 sensor using direct detection without the self-cancellation design.

Figure 20A:
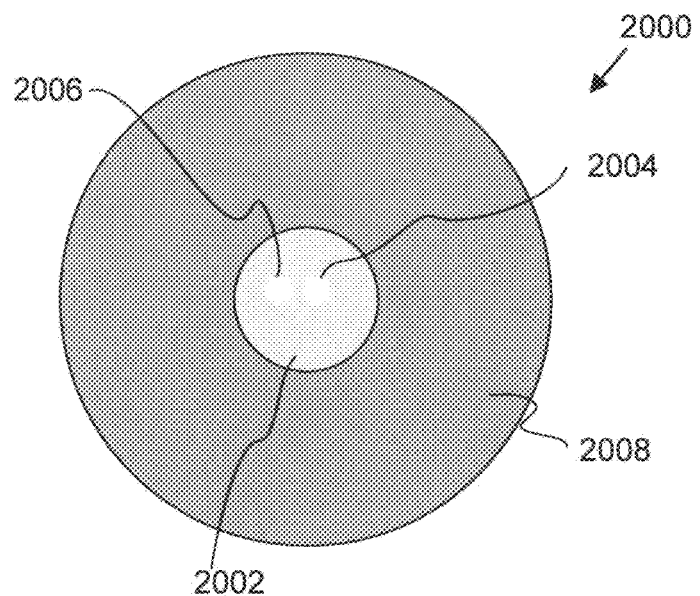
FIG. 20A shows a schematic of the eye image when both co-axis light source and the reference light source in FIG. 18A are turned.

FIG. 20A shows a schematic of an exemplary eye image 2000 when both co-axis light source and the reference light source in FIG. 18A are turned on. Note that pupil 2002 is bright. The bright spot 2004 on the right within pupil 2002 represents the corneal reflection image of co-axis light sources 1804 shown in FIG. 18A, and the bright spot 2006 on the left represents the corneal reflection image of the reference light sources 1806 shown in FIG. 18A. Because the reflected light from corneal surface 2008 has a wide divergence angle and the co-axis light source 1804 and the reference light sources 1806 are close to each other, the sensor 1810 in FIG. 18A receives same ratio of light power reflected by the corneal surface 2008 under the co-axis light sources 1804 illumination and under the reference light sources 1806 illumination. In other words, the eye mouse sensor does not distinguish the two light sources' corneal reflections unless the sensor resolution is extremely high. Due to the self-cancellation design wherein the two corneal reflections have the opposite phase, the corneal reflection contribution can be eliminated. Similarly to the corneal reflection cancellation, the influence of the reflection from other smooth surfaces, such as glasses frame surfaces, can also be also removed. Consequently, the self-cancellation design of eye mouse illustrated in FIG. 18A significantly improves the eye pupil detection. In a well-calibrated eye mouse sensor module, the AC signal strength directly reflects the eyes' retroreflection strength which is proportional to the eye pupil size.

Figure 20B:
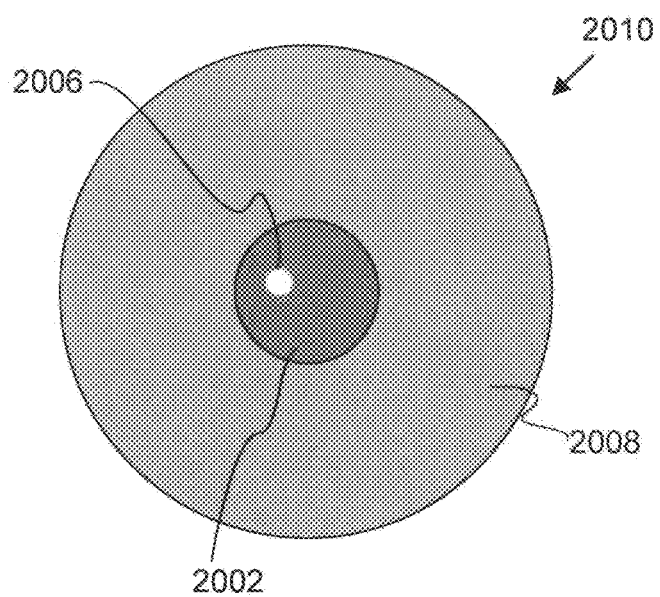
FIG. 20B shows a schematic of the eye image when only the reference light source in FIG. 18A is detected.

FIG. 20B shows a schematic of an exemplary eye image 2010 when only the reference light source 1806 in FIG. 18A is detected. In this situation, the pupil area 2002 is dark. The corneal reflection image 2006 of the reference light sources 1806 shown in FIG. 18A becomes detectable. This situation can be realized either by turning off the co-axis light sources 1804, or by modulating the two group of light sources at different frequencies so that the detection is done in different frequency bands.

Figure 20C:
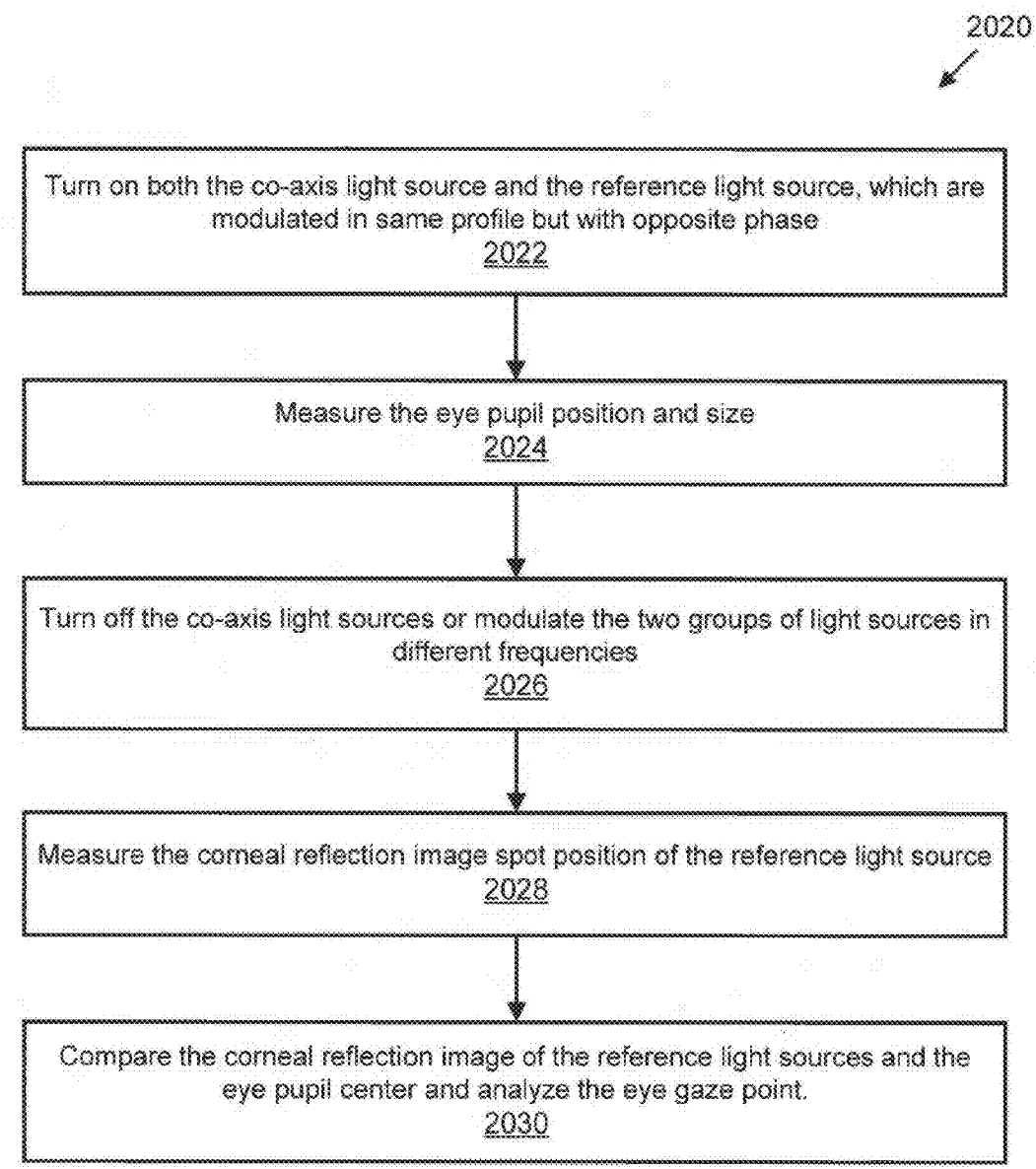
FIG. 20C presents a flowchart illustrating an exemplary process of tracking the eye gaze point.

FIG. 20C presents a flowchart illustrating an exemplary process (2020) of tracking the eye gaze point. The process (2020) is described in the context of FIGS. 18A, 20A and 20B. The process (2020) may begin by turning on both the co-axis light source and the reference light source with both of the light sources modulated with the same profile (e.g., same frequency and depth) but with substantially opposite phase (2022). The eye pupil position and size are measure (2024). Once the eye pupil positions are measured, the eye mouse sensor can focus on the nearby detector elements to detect the corneal reflection image 2006 of the reference light sources 1806. More specifically, the process can either turns off the co-axis light source or modulate the two groups of light sources at different frequencies (2026). The process can include measuring the corneal reflection image spot position of the reference light source (2028). The process can include comparing the corneal reflection image spot position of the reference light source and the position of the eye pupil center (2030). The offset between the eye pupil center and the corneal reflection image spot provides the information about the eye gaze direction. The process can also analyze the eye gaze point. The distance between the two images of both eyes on the sensor 1810 in FIG. 18A provides a measure scale to calibrate the eye gaze direction.

Figure 21:
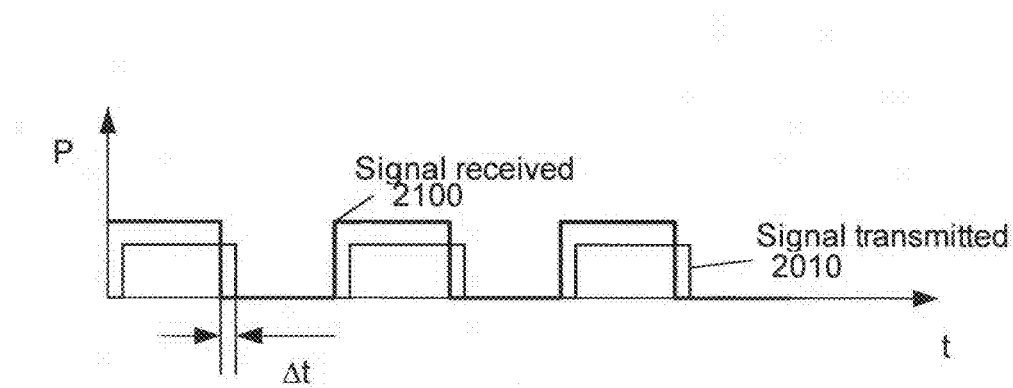
FIG. 21 shows the range finding function of the proposed eye mouse module.

FIG. 21 shows the range finding function of the proposed eye mouse module. With the eyes' retroreflection light, the proposed eye mouse module can realize a 3D detection function. More specifically, the range or the distance between the light sensor and the user's eyes may be measured by comparing the phase shift. Note that the received retroreflection light 2100 has a time delay with respect to the probe light 2010 that is transmitted towards the user's eyes. The processor in the eye mouse module can measure the distance from the sensor to the user's eyes by measuring the phase delay between the transmitted light signal and the received light signal. Note that the determined range or distance information can be combined with the determined point of gaze in the 2-D plane of the display to generate 3D eye-tracking data.

Figure 22:
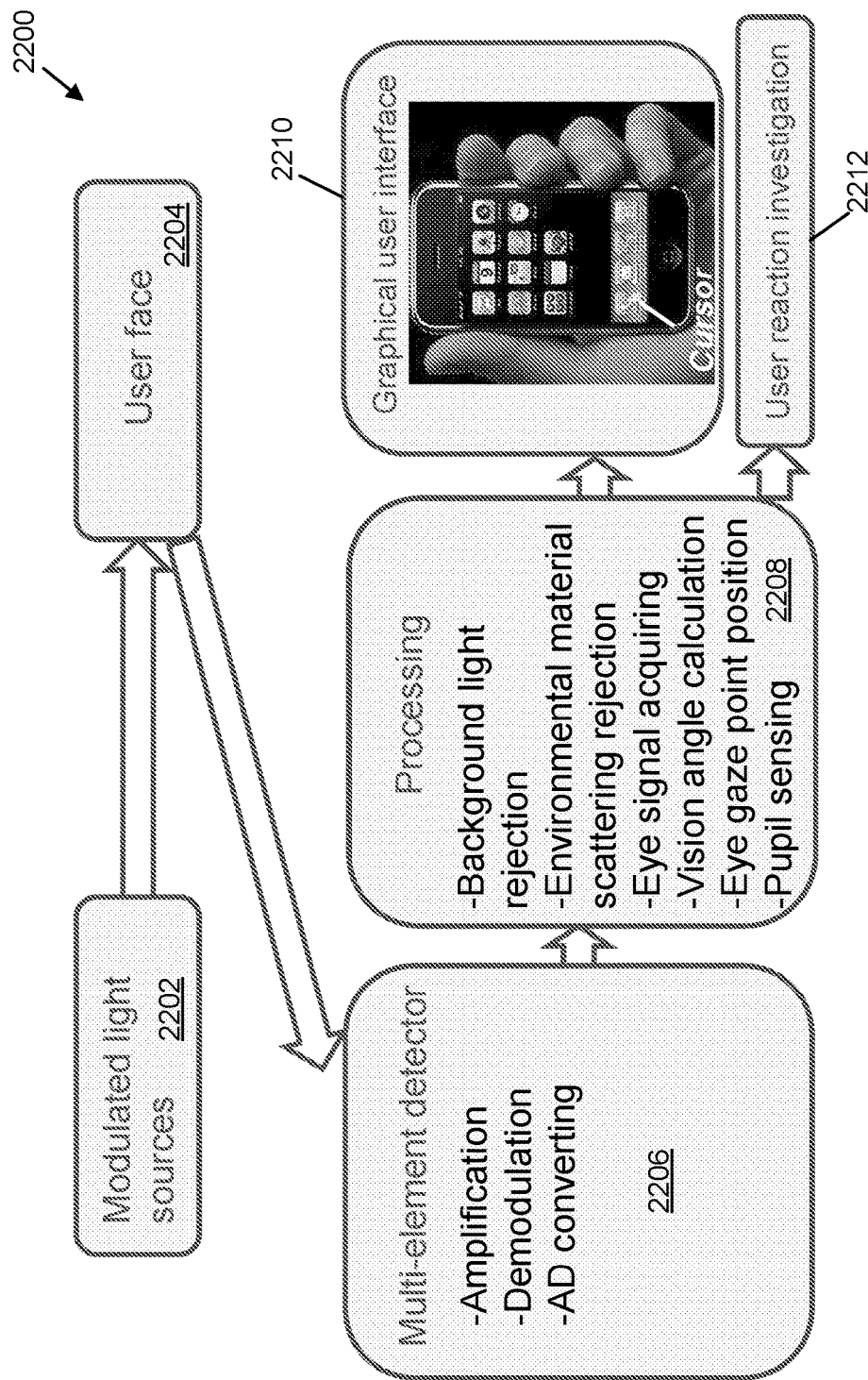
FIG. 22 shows a block diagram of signal acquisition of the proposed self-cancellation eye mouse module.

FIG. 22 shows a block diagram of an exemplary signal acquisition process 2200 of the proposed self-cancellation eye mouse module. As can be seen in FIG. 22, the co-axis light sources and the reference light sources generate modulated light (2202). The light beams of the co-axis light sources and the reference light sources are projected toward the user's face (2204). The sensor (i.e., the multi-element detector) in the self-cancellation eye mouse module receives the returned light (2206). The circuitry in the sensor filter out the DC component and demodulate and amplify the AC component. Both ambient background light and the face scattered light are suppressed. (2208) The eye track signal is then generated. After signal is analyzed, the eye pupil position, pupil size, and gaze direction are obtained. A mouse cursor is displayed on the screen of the mobile device (2010). When the mobile device is rotated or moved, or when the user's head rotates or moves, the cursor is continuously or actively adjusted to new positions that user wants. This self-cancellation eye mouse module functions substantially similarly to a regular optical mouse widely used in computer systems. Meanwhile, the eye pupil size change, and/or the eye blinks frequency vs. the screen frame content change are also detected to generate user reaction information (2012). This information can be used by games developers, advertisements businesses, and psychological researchers and other interested parties.

Figure 23:
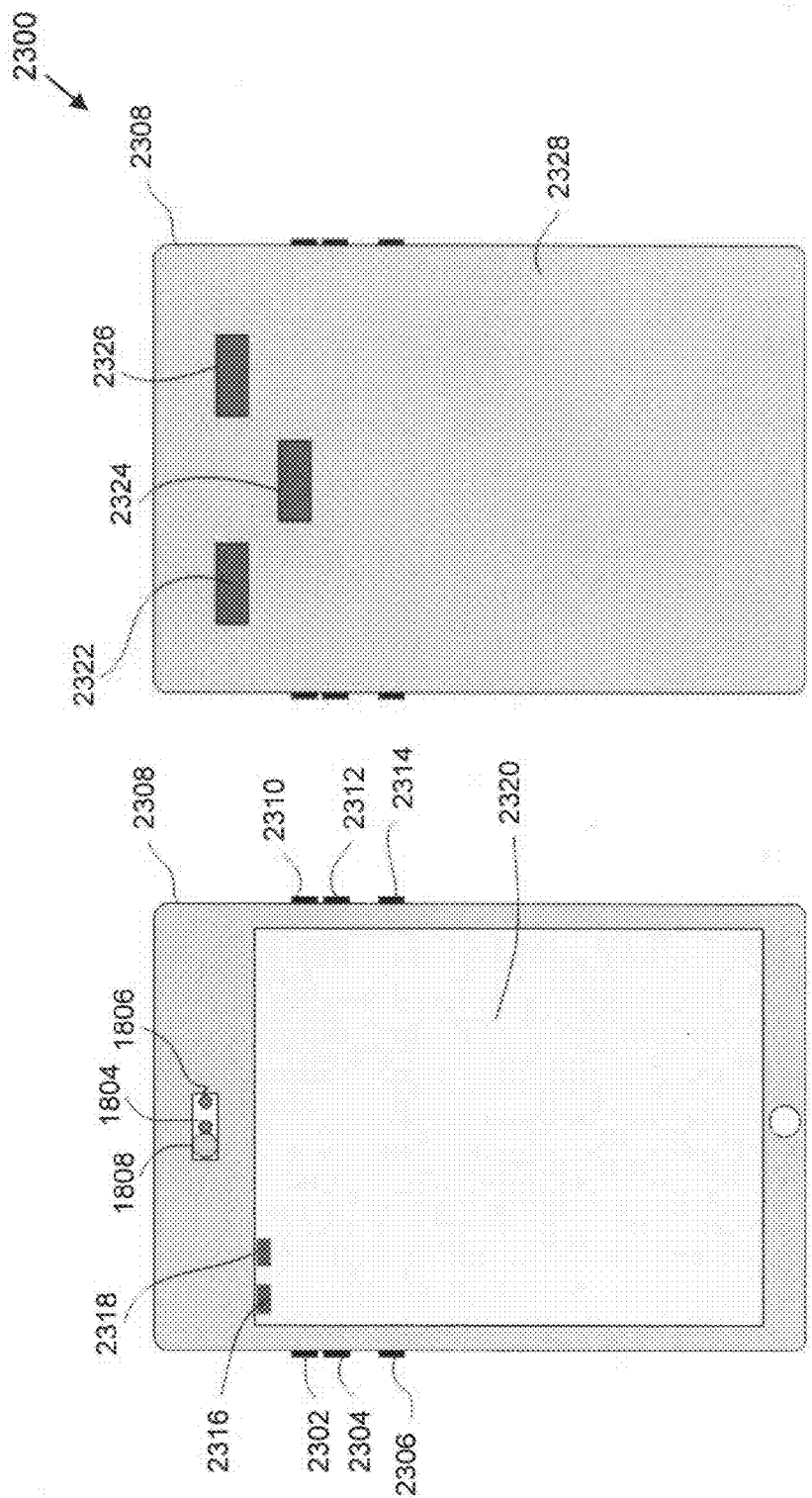
FIG. 23 shows a diagram of an exemplary eye mouse function buttons design on a user mobile device.

FIG. 23 shows a diagram of an exemplary eye mouse function buttons design on a user mobile device. In the example shown, the eye mouse function buttons 2302, 2304, and 2306 are designed on the left side of a user mobile device 2308. These buttons may be designated with functions of a regular mouse's left click, right click, and middle click respectively. As another example, the eye mouse function buttons 2310, 2312, and 2314 are designed on the right side of mobile device 2308 and designated with functions of regular mouse's left click, right click, and middle click respectively. In yet another example, the eye mouse function buttons 2316 and 2318 are designed on the front screen 2320 of mobile device 2308. Also on the front of the mobile device 2308 are light sources 1804 and 1806 and the optical lens 1808 for emitting the modulated light to the user and detecting the retroflection from the user's eye. In still another example, the eye mouse function buttons 2322, 2324, and 2326 are designed on the back side of mobile device 2308 and designated with functions of regular mouse's left click, right click, and middle click respectively. In some implementations however, the eye mouse buttons are shared with the existing buttons of the mobile device.

Figure 24:
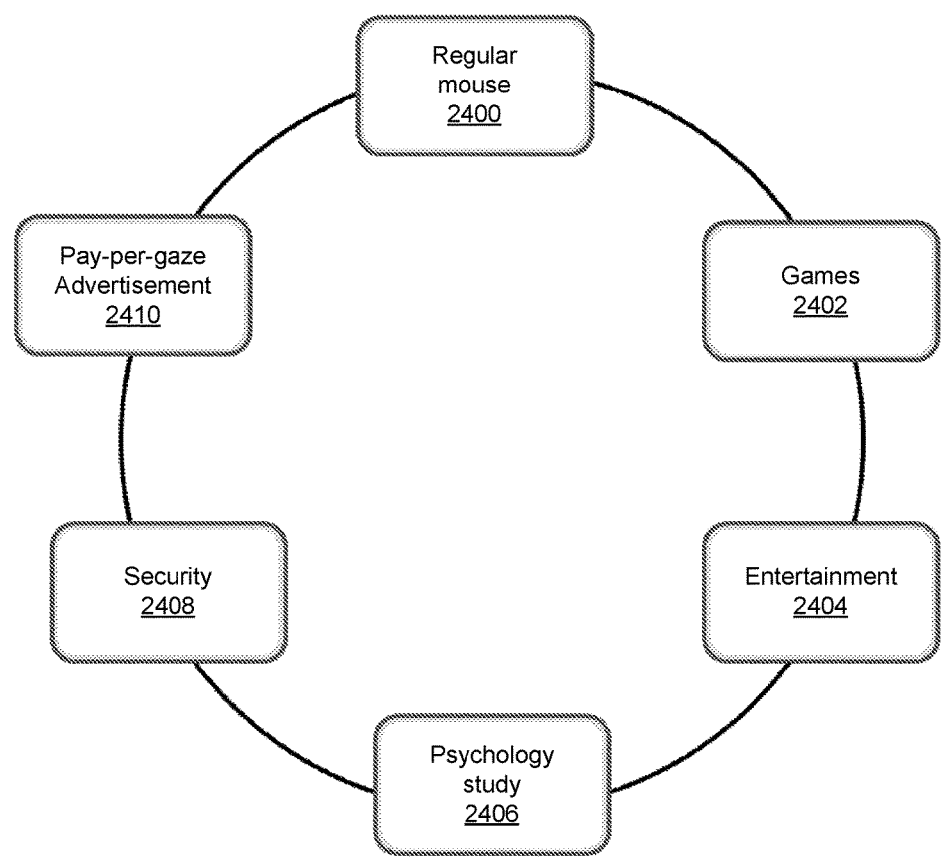
FIG. 24 shows a diagram of the targeted applications of the proposed eye mouse technology.

FIG. 24 shows a diagram of exemplary targeted applications of the proposed eye mouse technology. The proposed eye mouse design has a very small size, high resolution, low cost, and low power consumption. For example, an exemplary eye mouse design can have such a small size as about 2 mm in width, 4 mm in thickness, and 6 mm in length. Such as, the proposed eye mouse module can be easily integrated into small mobile terminals, such as smartphones, tablets, laptops, among others. Moreover, the proposed eye mouse is easy to use because: (1) user does not need to wear any extra tool on his/her head; (1) it allows for one hand operation; and (3) eye blink operation (as confirmation/selection) is made possible. Note that the proposed eye mouse may be calibration free, therefore feeling like a regular optical mouse. The proposed eye mouse is also friendly for further development. For example, the eye mouse may also be developed with talk function so that it can transmit and receive data among multiple mobile terminals without signal leakage to non-concerned user. Because of the above unique features, the proposed eye mouse technology is suitable for a wide range of applications.

For example, the eye mouse can be used as regular mouse 2400, and can be used to play computer games 2402. The eye mouse's eye gaze detection function may be used for pay-per-gaze advertisements 2410. As another example, the eye mouse's pupil size detection may be used to collect customer reaction data that is useful for advertisement management, games developer etc.

In one example, the eye mouse may be used in security access 2408. More specifically, when the user moves the eye mouse across his/her eyes, the light sources and the sensor detectors take the user's eye retina reflection properties which can be used to generate passcodes. In another example, the eye mouse is used in security typing. More specifically, when the user types the letters with the eye, people nearby cannot know which letters the user picks. The eye mouse can also be used in psychology studies 2406. More specifically, a designed series of questions, pictures, or videos may be presented to the user, and the eye mouse sensor measures the user's eye reactions in response to the questions, pictures, or videos. The collected information may help the psychologist to investigate the user's true thoughts.

As another example, the eye mouse may be used in entertainment 2404 such as spy camera finding. In a further example, with the equipped light sources and the sensor detectors, the proposed eye mouse can be used to transmit and receive data among other mobile devices which are equipped with same type of eye mouse. Furthermore, this proposed eye mouse technology may also find applications for providing disabled people who cannot handle regular mouse and keyboards with an alternative to control a computer cursor.

Mobile devices such as smartphone are becoming increasingly popular as content delivery tools for most users and the contents can include text message, articles, pictures, videos or combination of all of the above. It can be beneficial to be able to collect feedbacks on the user reactions to the contents displayed on the screen while they are viewing them. Embodiments of the disclosed technology can utilize the sensor module in a mobile device and the processing power in the mobile device, and communicate with a cloud based server to provide an integrated system which is capable of monitoring, analyzing and reporting of user's reaction to the contents in both real-time and on a statistical basis.

Figure 25:
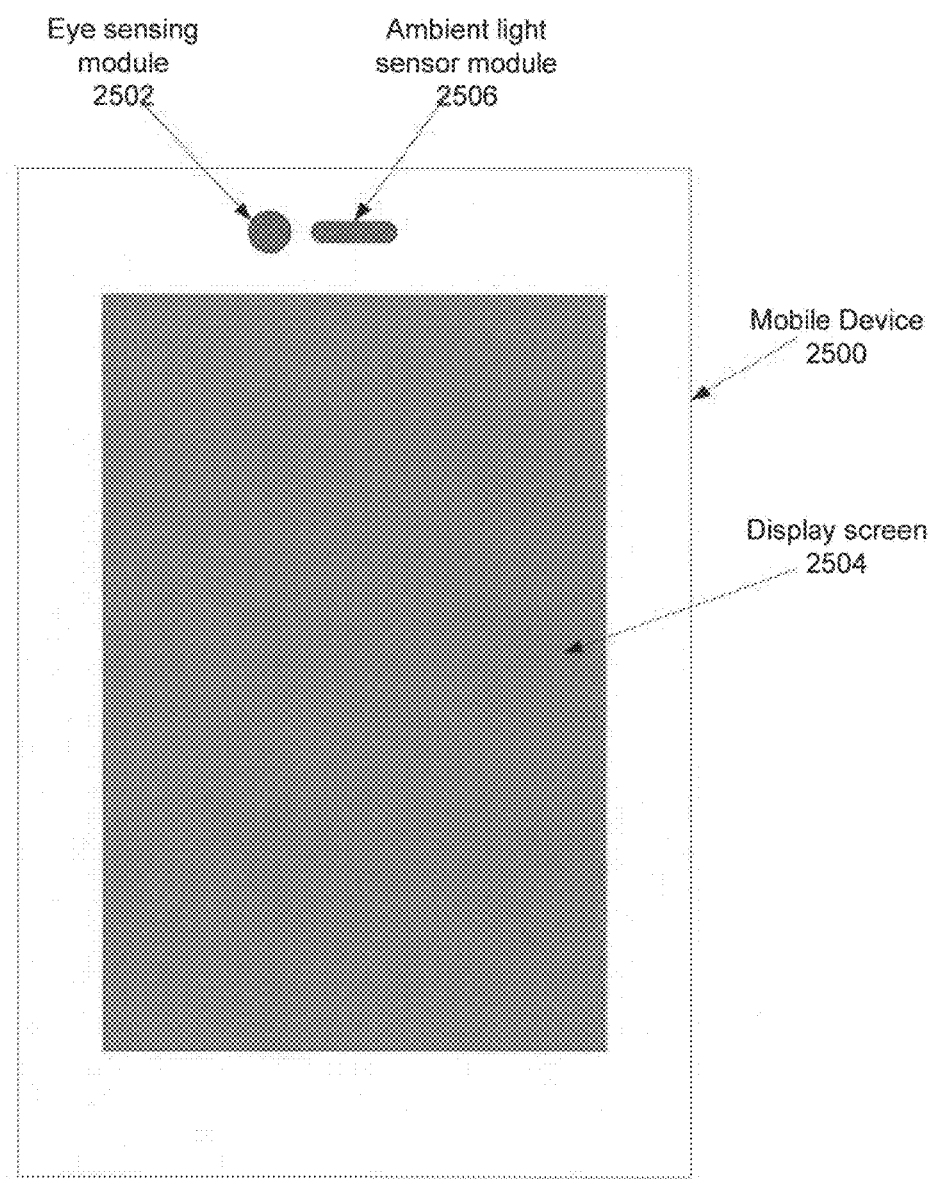
FIG. 25 shows a diagram of an exemplary mobile device (such as a smartphone) which has an integrated eye sensing module to collecting user reaction data.

As described above, the proposed user reaction system can use an eye tracking and sensing module (or "eye sensing module"). This eye sensing module may be integrated on the front-screen side of a mobile device to provide measurement of user's eye movement and pupil size changes. FIG. 25 shows a diagram of an exemplary mobile device 2500 (such as a smartphone) which has an integrated eye sensing module 2502 to collect user reaction data. In some embodiments, eye sensing module 2502 on device 2500 can capture data of user's eye dynamics while the user is viewing the display screen 2504. For example, user's pupil size may increase when the content the user is viewing is interesting to the user, and the user's pupil size may decrease if the content the user is view is uninteresting to the user. Also, user's pupil size may show sudden increase if new content that captures user's attention appears on the screen. Eye sensing module 2502 can capture this eye dynamic information periodically, for example, at a video rate of at least 30 frame/second. In general, the data capture may be performed at a frame rate equal or higher than the smartphone screen update rate. From each frame of the sensor data, the proposed user reaction system can obtain such information as: the user's pupil size change from a previous frame, and user's pupil position change from a previous frame in both vertical and horizontal directions.

Note that because the user's pupil size change is used to analyze user's reaction to the content, ambient light changes and display backlight changes that can also affect the user's pupil size need to be discriminated. When ambient light increased, pupil size will typically decrease, and if content screen brightness increases, user's pupil will decreases. These factors need to be considered to correct pupil size change measured by the eye sensor. In FIG. 25, mobile device 2500 also includes an ambient light sensor module 2506. In some embodiments, sensor module 2502 captures user reaction data which has information about the content on display based on the user's eye movement and sends to data to an application processor on device 2500. Meanwhile, the processor of the device 2500 also receives data from ambient light sensor module 2506. The dedicated programs in the processor can correct the eye sensing module 2502 data measurement of pupil size change with the ambient light variation data collected by ambient light sensor module 2506. Furthermore, the processor can also adjust the eye sensing module 2502 data using the displayed content brightness variation data from a display screen and display backlighting data from backlighting module integrated with the device to obtain a more accurate measure of the amount of pupil size change due to user's reaction to the displayed content.

In some embodiments, when the mobile device 2500 is also integrated with motion sensors, such as acceleration sensors and gyro sensor, the processor of the device 2500 can also receive motion sensor data collected at the same time. Such data provides additional information of user's reaction to the content. When the eye sensing module is built into a mobile device, the observed movement of user's eye in the eye sensing module can be affected by the movement of the mobile device itself. Thus, the proposed system can also include programs which receive data from built-in motion sensors to correct the eye sensing module 2502 measured user's eye movement data with the device movement data, such as the speed of the device movement. The motion sensors can include 3D acceleration sensor, and 3D gyro sensor. The correction can involves using a motion correction and stabilization technique used by imaging sensing applications.

Figure 26:
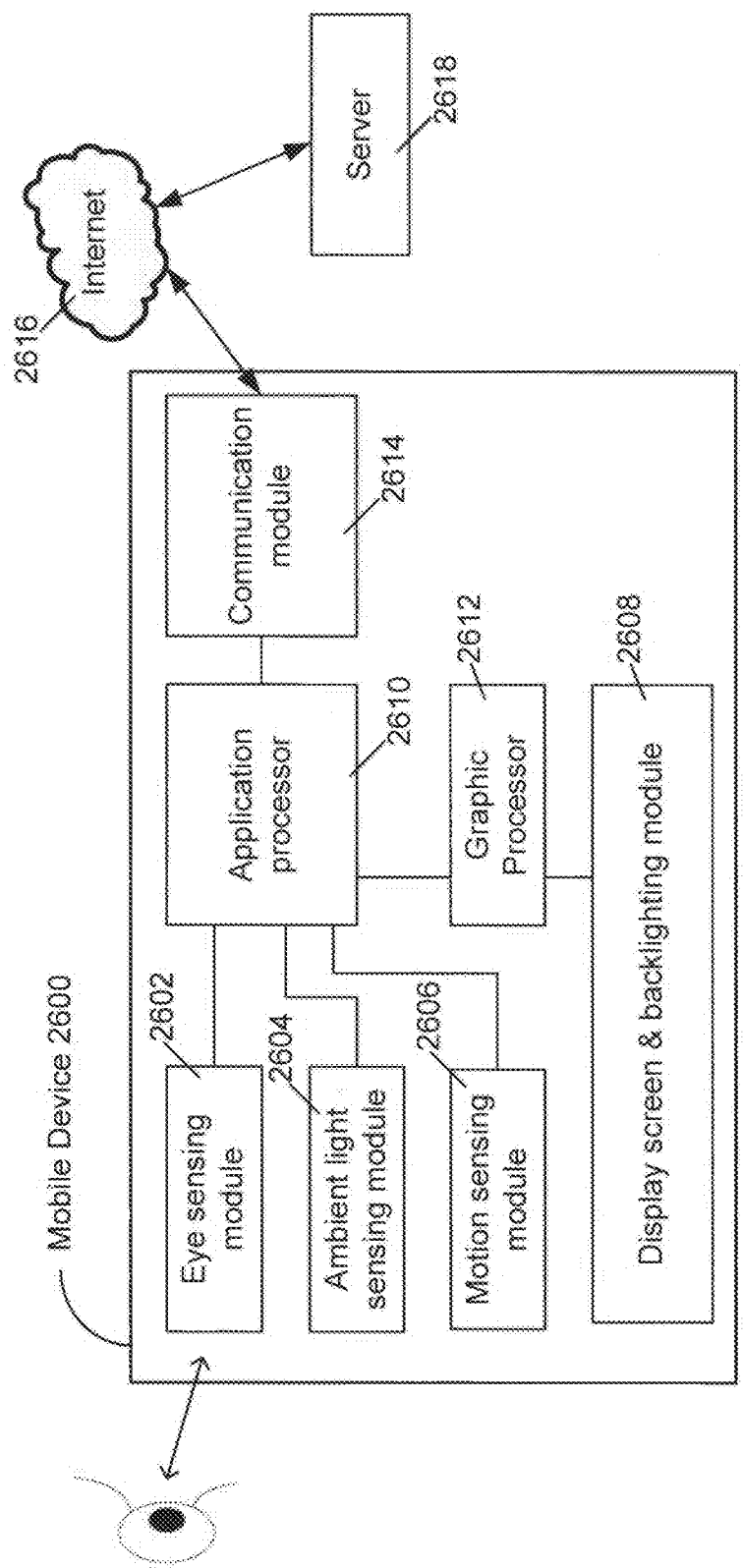
FIG. 26 shows a block diagram of an exemplary mobile device (such as a smartphone) which is integrated with an eye sensing module, an ambient light sensing module, and a motion sensing module to generate user reaction data.

FIG. 26 shows a block diagram of an exemplary mobile device 2600 (such as a smartphone) which is integrated with an eye sensing module 2602, an ambient light sensing module 2604, a motion sensing module 2606, and a display screen and backlighting module 2608 to generate user reaction data. As can be seen in FIG. 26, mobile device 2600 uses an application processor 2610 to collect measurement data from the eye sensing module 2602, the ambient light sensing module 2604, and the motion sensing module 2606. The application processor 2610 can also collect data from the display screen and backlighting module 2608 through a graphics processor 2612 which monitors display backlight setting changes and display content brightness changes. The application processor 2610 can combine the received data from these multiple sources to compute the user's pupil size changes and user's eye motion change parameters that truly reflect the user's reaction to the contents displayed on the screen. The application processor 2610 can then transmit the computed user reaction data to a communication module 2614, which can send the user reaction data to a server 2618 over a network 2616 such as the Internet. The server 2618 includes various hardware components including network adaptors (wired and/or wireless) for communicating and exchanging data with the user device and other servers such as a content provider. The server 2618 also includes a processor to process or analyze data (e.g., user reaction data) received from the user devices. The server 2618 also includes storage devices to store various data (e.g., user reaction data and analysis of the user reaction data). In addition, the server 2618 includes appropriate software to perform various functions necessary to communicate and exchange data with the user devices and other servers.

Figure 27:
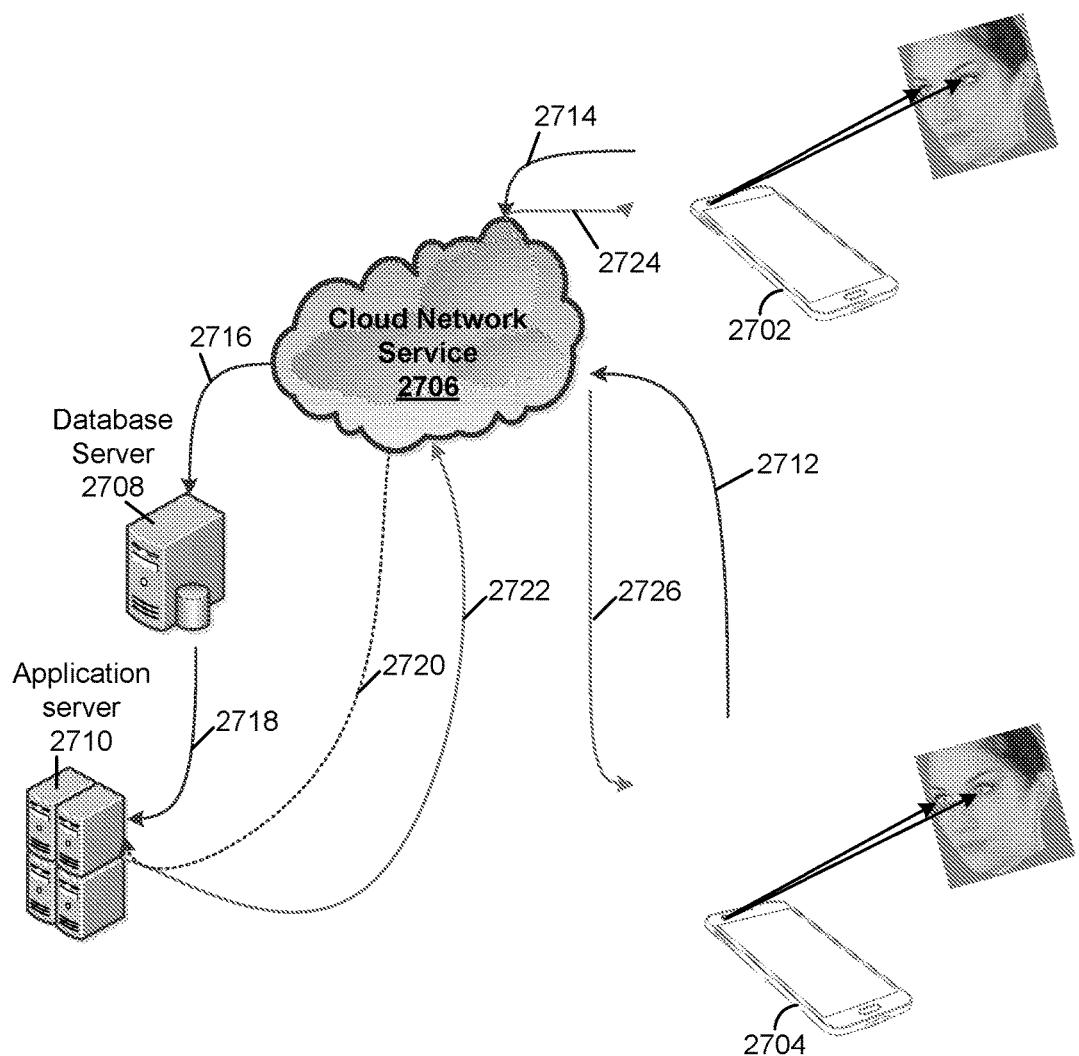
FIG. 27 illustrates user reaction data from multiple mobile device users are collected and analyzed.

FIG. 27 is a data flow diagram illustrating collection and analysis of user reaction data from multiple mobile device. Multiple mobile devices 2702 and 2704 can send, e.g., using their wireless connection, processed eye sensing module data (i.e., the user reaction data) of the multiple users, which may be combined with the display contents information, through a cloud network service 2706 to a database server 2708. Database server 2708 then analyzes the collected information. The database server 2708 can be a server of the displayed content provider, or can be a server of independent service provider, which collects the user reaction information from a large population, and provides statistical analysis data of the user reaction of different content to an application server (i.e., content provider) 2710, which distributes various contents. This data flow path is shown as the solid lines 2712, 2714, 2716 and 2718 going from the users toward application server 2710.

In some implementations, the user reaction data may also be directly transmitted to application server 2710, bypassing the database server 2708, and directly analyzed by the application server. This data flow path is shown as the dotted line 2720 going from network service 2706 toward application server 2710. In some implementations, the analyzed data is use by the application server 2710 to adjust contents to each individual user to induce more desirable reaction by the targeted users. This data flow path is shown as the solid lines 2722, 2724 and 2726 going from application server 2710 toward multiple mobile devices 2702 and 2704. Hence, using the described user reaction feedback system, an content provider can adjust the delivered contents custom to each user based on the user's reaction of previously viewed contents.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuitry).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A device for eye-tracking, the device comprising:
    a photodetector module;
    two groups of light sources disposed on the device at respective locations relative to a location of the photodetector module, each group of light sources configured to emit a modulated light;
    wherein the respective modulated lights emitted by the two groups of light sources are modulated at a substantially same modulation frequency and out of phase with each other;
    responsive to emitting the modulated lights by the two groups of light sources, the photodetector module is configured to receive a return light including at least a partial retroreflected light from an eye of the user; and a processor in communication with the photodetector module and the two groups of light sources, the processor is configured to process an output signal from the photodetector module to determine positional and dimensional parameters of the eye of the user based at least on the received partial retroreflected light.

2. The device of claim 1, wherein the location of one of the groups of light sources is closest to the photodetector module than any other in the two or more groups of light sources such that the partial retroreflected light received by the photodetector module is based more on the modulated light emitted by the group of light sources having the closest location than any other in the two or more groups of light sources.

3. The device of claim 1, further comprising a receiving lens positioned in front of the photodetector module to collect the received partial retroreflected light and direct the collected partial retroreflected light onto the photodetector module.

4. The device of claim 3, wherein one group of light sources is disposed in proximity of an optical axis of the receiving lens and another group of light sources is disposed away from the optical axis of the receiving lens.

5. The device of claim 3, wherein the receiving lens and the two or more groups of light sources are configured such that the retroreflected light from the eye based on the modulated light emitted by one of the groups of light sources projects substantially onto the receiving lens, and wherein the retroreflected light from the eye based on the modulated light emitted by another group of light sources projects substantially off the receiving lens.

6. The device of claim 1, further comprising filtering circuitry communicatively linked to photodetector module to filter the photodetector module output signal to reject background light and scattered light based on the respective modulated lights.

7. The device of claim 6, wherein the scattered light is generated when the respective modulated lights scatter off the user's face and other surfaces near the user's face.

8. The device of claim 6, wherein the scattered light based on the modulated light emitted by one of the groups of light sources is substantially 180° out of phase with respect to the scattered light based on the modulated light emitted by another group of light sources.

9. The device of claim 6, wherein the filtering circuitry includes a bandpass filter to reject the background light.

10. The device of claim 1, wherein the two or more groups of light sources are configured to emit respective modulated lights at substantially the same wavelength.

11. The device of claim 1, further comprising a display interface, wherein the processor is configured to determine a location of gaze of the eye of the user based on the determined positional parameters, and the display interface is configured to display a cursor on the display interface at the determined location of gaze.

12. The device of claim 11, wherein the display interface and the processor in combination are configured to actively adjust the position of the cursor based on updated positional parameters.

13. The device of claim 1, wherein a strength of the output signal from the photodetector module is proportional to a strengthen of the retroreflection of the eye, which is further proportional to the pupil size of the eye.

14. A mobile device for controlling a cursor based on a user's gaze, comprising:
a display interface;
a surface area adjacent to the display interface;
a first group of light sources placed at a first location on the surface area and operable to emit a first modulated light;
a second group of light sources placed at a second location on the surface area and operable to emit a second modulated light;
wherein the first modulated light and the second modulated light have substantially the same modulation frequency, and wherein the modulation phases of the first modulated light and the second modulated light are substantially opposite to each other,
wherein the first group of light sources and the second group of light sources are configured to emit the first and second modulated lights toward an eye of a user of the user-operated device;
a photodetector module configured to receive a return light including at least a partial retroreflected light from an eye of the user based on the first and second modulated lights emitted from the first and second groups of light sources; and
a processor communicatively coupled to the photodetector module and the first and second groups of light sources, the processor is configured to process an output signal from the photodetector module to determine a location of gaze of the eye of the user based at least on the partial retroreflected light corresponding to the first and second modulated lights,
wherein the display interface is configured to display a cursor at the determined location of gaze.

15. The mobile device of claim 14, wherein the display interface in collaboration with the processor is further configured to continuously adjust the position of the cursor based on updated locations of gaze of the eye.

16. The mobile device of claim 14, wherein the photodetector module is configured to track relative linear motions and rotational motions between the mobile device and the eye of the user, and generate the output signal which reflects effects of the relative linear motions and rotational motions on the location of gaze.

17. The mobile device of claim 14, wherein the strength of the output signal from the photodetector module is proportional to the strengthen of the retroreflection of the eye, which is further proportional to the pupil size of the eye.

18. The mobile device of claim 14, wherein the processor is further configured to process the output signal to determine the size of the pupil of the eye.

19. The mobile device of claim 14, wherein the processor is further configured to process the output signal to determine a distance between the mobile device and the eye of the user.

20. The mobile device of claim 14, further comprising:
a device exterior; and
one or more buttons located on the mobile device to perform mouse functions at the location of the displayed cursor.

21. The mobile device of claim 20, wherein the one or more buttons are placed on the left side, right side, or back side of the device exterior.

22. The mobile device of claim 20, wherein the one or more buttons are displayed on the display interface.

23. The mobile device of claim 20, wherein the one or more buttons are operable in combination with existing buttons of the mobile device.

24. The mobile device of claim 20, wherein the one or more buttons are configured to perform regular mouse's left click, right click, middle click functions.

25. A method for tracking eye movement at a device, comprising:
- using a first group of light sources of the device to emit a first modulated light and a second group of light sources of the device to emit a second modulated light toward an eye of a user, wherein the first modulated light and the second modulated light have substantially the same modulation frequency, and wherein the modulation phases of the first modulated light and the second modulated light are substantially opposite to each other;
- receiving at a photodetector module of the device, a returned light including at least a partial retroreflected light from the eye of the user based on the first and second modulated lights from the first and second groups of light sources;
- filtering the received return light to reject background light and scattered light; and
- processing an output signal from the photodetector module to determine positional and dimensional parameters of the eye of the user based at least on the partial retroreflected light corresponding to the first and second groups of modulated light sources.

26. The method of claim 25, wherein the scattered light based on the first modulated light is substantially 180° out of phase with respect to the scattered light based on the second modulated light.

27. The method claim 25, wherein:
- processing the output signal includes determining the positional and dimensional parameters of the eye based on differential values of the partial retroreflected lights corresponding to the first and second groups of light sources.

28. The method of claim 25, wherein using the first and second groups of light sources including using the first and second groups of light sources to emit modulated lights in the visible wavelengths.

29. The method of claim 25, wherein using the first and second groups of light sources include using first and second groups of light sources to emit modulated lights in the ultraviolet and infrared wavelengths.

30. The method of claim 25, wherein using the first and second groups of light sources include using the first and second groups of light sources to emit modulated light of different wavelengths; and
- the method further comprising calibrating the first and second groups of light sources to match.

31. The method of claim 25, comprising:
- using the first and second groups of light sources to emit lights of same modulation frequency to perform self-cancellation detection.

32. The method of claim 25, comprising:
- processing the output signal from the photodetector module to determine a location of gaze of the eye of the user on a display screen of the device based at least on the partial retroreflected light corresponding to the first and second modulated lights; and
- displaying on the display screen a cursor at the determined location of gaze.

33. The method of claim 32, further comprising continuously adjusting the position of the cursor on the display interface based on updated locations of gaze of the eye.

34. The method of claim 32, comprising:
- using the first and second groups of light sources to emit modulated lights of different modulation frequencies to detect a direction of eye gaze.

35. The method of claim 32, comprising:
- changing the location of the cursor responsive to a change in the eye gaze direction; and
- providing one or more cursor activation buttons on the device to activate a selection, an operation or interaction of the cursor on the display screen.

36. The method of claim 35, comprising:
- using an input received through the one or more cursor activation buttons to provide additional control functions on the device.

37. The method of claim 35, comprising:
- detecting a change in the eye's pupil size in connection with tracking the eye movement based on an input received through the one or more cursor activation buttons.

38. The method of claim 35, comprising:
- measuring the eye gaze direction in connection with tracking the eye movement based on an input received through the one or more cursor activation buttons.

39. The method of claim 35, wherein:
- transmitting and receiving data carried on the emitted modulated lights and detected return light based on an input received through one or more cursor activation buttons.

40. The method of claim 25, wherein the first and second light sources and the photodetector module are located on an edge of the device.

41. The method of claim 25, wherein the emitted first and second modulated lights include a flashing light at a frequency correlated with a frame rate of the photodetector module to enhance the eye signal detection and further reject the background light.

42. The method of claim 25, comprising:
- processing the output signal from the photodetector module to determine a location of gaze of the eye of the user on a display screen of the device based at least on the partial retroreflected light corresponding to the first and second modulated lights; and
- using the determined location of the gaze of the eye of the user on the display screen to detect the user's gaze on a pay-per-gaze advertisement.

43. The method of claim 25, comprising:
- processing the output signal from the photodetector module to determine a location of gaze of the eye of the user on a display screen of the device based at least on the partial retroreflected light corresponding to the first and second modulated lights; and
- using the determined location of the gaze of the eye of the user on the display screen to control a game play in a game application.

44. The method of claim 25, comprising:
- presenting at least one content associated with marketing research on a display screen of the device;
- analyzing the determined positional and dimensional parameters of the eye of the user to determine the user's reaction to the at least on content displayed on the display screen; and
- collecting the determined users' reaction to the presented at least one content associated with market research.

45. The method of claim 25, comprising:
- processing the output signal from the photodetector module to determine a location of gaze of the eye of the user on a display screen of the device based at least on the partial retroreflected light corresponding to the first and second modulated lights; and using the determined location of the gaze of the eye of the user on the display screen to enable secure access or secure data input.

\* \* \* \* \*